US012328710B2

(12) United States Patent
Dutta et al.

(10) Patent No.: US 12,328,710 B2
(45) Date of Patent: Jun. 10, 2025

(54) TECHNIQUES FOR INTER-USER EQUIPMENT (UE) COORDINATION-BASED SIDELINK COMMUNICATIONS

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/045,095

(22) Filed: Oct. 7, 2022

(65) Prior Publication Data

US 2024/0121756 A1 Apr. 11, 2024

(51) Int. Cl.
*H04W 72/02* (2009.01)
*H04W 72/56* (2023.01)

(52) U.S. Cl.
CPC ........... *H04W 72/02* (2013.01); *H04W 72/56* (2023.01)

(58) Field of Classification Search
CPC .............................. H04W 72/02; H04W 72/56
See application file for complete search history.

(56) References Cited

U.S. PATENT DOCUMENTS

2022/0070845 A1* 3/2022 Stauffer ............... H04B 7/0697
2022/0086700 A1* 3/2022 Nguyen ............... H04W 24/10
2022/0232528 A1* 7/2022 Sartori .................... H04W 4/40

* cited by examiner

*Primary Examiner* — Won Tae C Kim
(74) *Attorney, Agent, or Firm* — Dalei Dong; Holland & Hart LLP

(57) ABSTRACT

Methods, systems, and devices for wireless communications are described. A first user equipment (UE) sense sidelink transmissions to determine a set of resources that may be reserved by one or more other UEs. The set of resources may include a first subset of resources associated with a first radio access technology (RAT) and a second subset of resources associated with a second, different RAT. The first UE may transmit a message to a second UE indicating resource information for transmissions by the second UE, and the resource information may indicate that the first subset of resources is associated with the first RAT and that the second subset of resources is associated with the second RAT. Additionally, or alternatively, the first UE may transmit an indication of collisions between resources reserved for transmissions associated with the first RAT and resources reserved for transmissions associated with the second RAT.

30 Claims, 16 Drawing Sheets

TECHNIQUES FOR INTER-USER EQUIPMENT (UE) COORDINATION-BASED SIDELINK COMMUNICATIONS

FIELD OF DISCLOSURE

The present disclosure, for example, relates to wireless communication systems, and more particularly to techniques for inter-user equipment (UE) coordination-based sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Wireless communications systems may support devices that communicate using different radio access technologies (RATs). For example, a UE may communicate using a first RAT (e.g., NR), a second, different RAT (e.g., LTE), or both. In some examples, different devices that communicate using different RATs may share some of the wireless spectrum.

SUMMARY

The present disclosure relates to improved methods, systems, devices, and apparatuses that support techniques for inter-user equipment (UE) coordination-based sidelink communications. For example, a first UE may perform sensing of one or more sidelink channels to determine a set of resources of a resource pool reserved by one or more other UEs for sidelink communications. The set of resources may include a first subset of resources associated with a first radio access technology (RAT) and a second subset of resources associated with a second RAT different from the first RAT. The first UE may transmit a message to a second UE indicating resource information for transmissions by the second UE. The resource information may indicate that the first subset of resources is associated with the first RAT and that the second subset of resources is associated with the second RAT. The second UE may select resources for a transmission associated with the first RAT based on the resource information.

Additionally, or alternatively, an indication a collision between resources reserved for transmissions associated with the first RAT and resources reserved for transmissions associated with the second RAT may be transmitted by a UE. For example, the second UE may transmit, to the first UE, a message indicating resources reserved for a transmission associated with the first RAT. The first UE may detect a collision between the resources reserved by the second UE and one or more resources associated with (e.g., reserved or allocated for) the second RAT. The first UE may transmit a message indicating the collision to the second UE, which may re-select resources for the transmission based on the indicated collision.

A method for wireless communications at a first UE is described. The method may include performing sensing of one or more sidelink messages that indicate a set of resources of a resource pool that are reserved by one or more other UEs for sidelink communications, respective resources of the set of resources being associated with a first RAT or a second RAT different from the first RAT and transmitting, to a second UE, a message indicating resource information for transmissions by the second UE, where the resource information indicates that a first subset of resources of the set of resources is associated with the first RAT and a second subset of resources of the set of resources is associated with the second RAT.

An apparatus for wireless communications at a first UE is described. The apparatus may include a processor, memory coupled with the processor, and instructions stored in the memory. The instructions may be executable by the processor to cause the apparatus to perform sensing of one or more sidelink messages that indicate a set of resources of a resource pool that are reserved by one or more other UEs for sidelink communications, respective resources of the set of resources being associated with a first RAT or a second RAT different from the first RAT and transmit, to a second UE, a message indicating resource information for transmissions by the second UE, where the resource information indicates that a first subset of resources of the set of resources is associated with the first RAT and a second subset of resources of the set of resources is associated with the second RAT.

Another apparatus for wireless communications at a first UE is described. The apparatus may include means for performing sensing of one or more sidelink messages that indicate a set of resources of a resource pool that are reserved by one or more other UEs for sidelink communications, respective resources of the set of resources being associated with a first RAT or a second RAT different from the first RAT and means for transmitting, to a second UE, a message indicating resource information for transmissions by the second UE, where the resource information indicates that a first subset of resources of the set of resources is associated with the first RAT and a second subset of resources of the set of resources is associated with the second RAT.

A non-transitory computer-readable medium storing code for wireless communications at a first UE is described. The code may include instructions executable by a processor to perform sensing of one or more sidelink messages that indicate a set of resources of a resource pool that are reserved by one or more other UEs for sidelink communications, respective resources of the set of resources being associated with a first RAT or a second RAT different from the first RAT and transmit, to a second UE, a message indicating resource information for transmissions by the second UE, where the resource information indicates that a first subset of resources of the set of resources is associated with the first RAT and a second subset of resources of the set of resources is associated with the second RAT.

In some examples of the method, apparatuses, and non-transitory computer-readable medium described herein, transmitting the message indicating the resource information may include operations, features, means, or instructions for transmitting the resource information indicating that the second subset of resources may be to be excluded from available resources for the transmissions by the second UE based on the second subset of resources being associated with the second RAT.

In some examples of the method, apparatuses, and non-transitory computer-readable medium described herein, transmitting the message indicating the resource information may include operations, features, means, or instructions for transmitting the resource information indicating that the first subset of resources may be to be included in available resources for the transmissions by the second UE based on the first subset of resources being associated with the first RAT.

In some examples of the method, apparatuses, and non-transitory computer-readable medium described herein, transmitting the message indicating the resource information may include operations, features, means, or instructions for transmitting an indication of a resource partition for the resource pool, the resource partition separating the resource pool into the first subset of resources and the second subset of resources.

In some examples of the method, apparatuses, and non-transitory computer-readable medium described herein, the indication of the resource partition includes an index corresponding to a percentage of resources of the resource pool that may be allocated for transmissions associated with the first RAT, an index corresponding to a percentage of resources of the resource pool that may be allocated for transmissions associated with the second RAT, or both.

In some examples of the method, apparatuses, and non-transitory computer-readable medium described herein, the indication of the resource partition includes a bitmap indicating resources of the resource pool that may be available for the transmissions by the second UE, resources of the resource pool that may be unavailable for the transmissions by the second UE, or both.

In some examples of the method, apparatuses, and non-transitory computer-readable medium described herein, transmitting the message indicating the resource information may include operations, features, means, or instructions for transmitting, as part of the message, an indication of a periodicity for applying the resource information, a periodicity with which the set of resources may be reserved by the other UEs, a zone identifier (ID) associated with the first UE, a group ID associated with the first UE, a priority associated with the second subset of resources, or a combination thereof.

Some examples of the method, apparatuses, and non-transitory computer-readable medium described herein may further include operations, features, means, or instructions for receiving, from the second UE, a request for the resource information, where transmitting the message may be based on the request.

In some examples of the method, apparatuses, and non-transitory computer-readable medium described herein, transmitting the message indicating the resource information may include operations, features, means, or instructions for transmitting sidelink control information (SCI), a medium access control (MAC) control element (MAC-CE), or a signal multiplexed with data associated with the first RAT.

A method for wireless communications at a second UE is described. The method may include receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications, selecting one or more resources from the resource pool for a data message based on the resource information, and transmitting the data message in accordance with the first RAT using the selected one or more resources.

An apparatus for wireless communications at a second UE is described. The apparatus may include a processor, memory coupled with the processor, and instructions stored in the memory. The instructions may be executable by the processor to cause the apparatus to receive, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications, select one or more resources from the resource pool for a data message based on the resource information, and transmit the data message in accordance with the first RAT using the selected one or more resources.

Another apparatus for wireless communications at a second UE is described. The apparatus may include means for receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications, means for selecting one or more resources from the resource pool for a data message based on the resource information, and means for transmitting the data message in accordance with the first RAT using the selected one or more resources.

A non-transitory computer-readable medium storing code for wireless communications at a second UE is described. The code may include instructions executable by a processor to receive, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications, select one or more resources from the resource pool for a data message based on the resource information, and transmit the data message in accordance with the first RAT using the selected one or more resources.

In some examples of the method, apparatuses, and non-transitory computer-readable medium described herein, selecting the one or more resources may include operations, features, means, or instructions for excluding at least one resource from the resource pool based on the resource information indicating that the second subset of resources may be to be excluded, where the second subset of resources may be to be excluded based on the second subset of resources being associated with the second RAT, and where the second subset of resources includes the at least one resource.

In some examples of the method, apparatuses, and non-transitory computer-readable medium described herein, selecting the one or more resources may include operations, features, means, or instructions for including at least one resource in the resource pool based on the resource information indicating that the first subset of resources may be to be included, where the first subset of resources may be to be included based on the first subset of resources being associated with the first RAT, and where the first subset of resources includes the at least one resource.

In some examples of the method, apparatuses, and non-transitory computer-readable medium described herein, receiving the message indicating the resource information may include operations, features, means, or instructions for receiving an indication of a resource partition for the resource pool, the resource partition separating the resource pool into the first subset of resources and the second subset of resources.

In some examples of the method, apparatuses, and non-transitory computer-readable medium described herein, the indication of the resource partition includes an index and the method, apparatuses, and non-transitory computer-readable medium may include further operations, features, means, or instructions for mapping the index to a percentage of resources of the resource pool that may be allocated for transmissions associated with the first RAT, a percentage of resources of the resource pool that may be allocated for transmissions associated with the second RAT, or both.

In some examples of the method, apparatuses, and non-transitory computer-readable medium described herein, selecting the one or more resources may include operations, features, means, or instructions for excluding at least one resource from the resource pool based on the bitmap.

In some examples of the method, apparatuses, and non-transitory computer-readable medium described herein, selecting the one or more resources may include operations, features, means, or instructions for excluding at least one resource of the second subset of resources from the resource pool based on a priority associated with the second subset of resources, a priority associated with the message, a reference signal received power associated with the message, or a combination thereof.

In some examples of the method, apparatuses, and non-transitory computer-readable medium described herein, selecting the one or more resources may include operations, features, means, or instructions for selecting the one or more resources based on the message further indicating a periodicity for applying the resource information, a periodicity with which the set of resources may be reserved by the other UEs, a zone ID associated with the first UE, a group ID associated with the first UE, a priority associated with the second subset of resources, or a combination thereof.

In some examples of the method, apparatuses, and non-transitory computer-readable medium described herein, receiving the message indicating the resource information may include operations, features, means, or instructions for receiving sidelink control information, a MAC-CE, or a signal multiplexed with data associated with the first RAT.

Some examples of the method, apparatuses, and non-transitory computer-readable medium described herein may further include operations, features, means, or instructions for transmitting, to the first UE, a request for the resource information, where receiving the message may be based on the request.

In some examples of the method, apparatuses, and non-transitory computer-readable medium described herein, selecting the one or more resources may include operations, features, means, or instructions for applying the resource information for the first message based on receiving the message within the first time interval.

Some examples of the method, apparatuses, and non-transitory computer-readable medium described herein may further include operations, features, means, or instructions for receiving a second message indicating second resource information for the transmissions by the second UE, where the second message may be received during a second time interval that may be subsequent to the first time interval and discarding the second message based on receiving the second message during the second time interval.

A method for wireless communications at a first UE is described. The method may include performing sensing of one or more sidelink messages that indicate a set of resources of a resource pool that are reserved by one or more other UEs, respective resources of the set of resources being associated with a first RAT or a second RAT different from the first RAT, receiving, from a second UE, a first message indicating a resource reservation for a data message to be transmitted by the second UE, the data message associated with the first RAT, and transmitting, to the second UE, a second message indicating a collision between the data message and one or more resources of the set of resources associated with the second RAT, where the collision is based on the data message and the one or more resources at least partially overlapping.

An apparatus for wireless communications at a first UE is described. The apparatus may include a processor, memory coupled with the processor, and instructions stored in the memory. The instructions may be executable by the processor to cause the apparatus to perform sensing of one or more sidelink messages that indicate a set of resources of a resource pool that are reserved by one or more other UEs, respective resources of the set of resources being associated with a first RAT or a second RAT different from the first RAT, receive, from a second UE, a first message indicating a resource reservation for a data message to be transmitted by the second UE, the data message associated with the first RAT, and transmit, to the second UE, a second message indicating a collision between the data message and one or more resources of the set of resources associated with the second RAT, where the collision is based on the data message and the one or more resources at least partially overlapping.

Another apparatus for wireless communications at a first UE is described. The apparatus may include means for performing sensing of one or more sidelink messages that indicate a set of resources of a resource pool that are reserved by one or more other UEs, respective resources of the set of resources being associated with a first RAT or a second RAT different from the first RAT, means for receiving, from a second UE, a first message indicating a resource reservation for a data message to be transmitted by the second UE, the data message associated with the first RAT, and means for transmitting, to the second UE, a second message indicating a collision between the data message and one or more resources of the set of resources associated with the second RAT, where the collision is based on the data message and the one or more resources at least partially overlapping.

A non-transitory computer-readable medium storing code for wireless communications at a first UE is described. The code may include instructions executable by a processor to perform sensing of one or more sidelink messages that indicate a set of resources of a resource pool that are reserved by one or more other UEs, respective resources of the set of resources being associated with a first RAT or a second RAT different from the first RAT, receive, from a second UE, a first message indicating a resource reservation for a data message to be transmitted by the second UE, the data message associated with the first RAT, and transmit, to the second UE, a second message indicating a collision between the data message and one or more resources of the set of resources associated with the second RAT, where the collision is based on the data message and the one or more resources at least partially overlapping.

Some examples of the method, apparatuses, and non-transitory computer-readable medium described herein may further include operations, features, means, or instructions for transmitting, to the second UE, a third message indicating resource information for transmissions by the second UE based on transmitting the second message, where the resource information indicates that a first subset of resources of the set of resources may be associated with the first RAT and a second subset of resources of the set of resources may be associated with the second RAT.

In some examples of the method, apparatuses, and non-transitory computer-readable medium described herein, transmitting the second message may include operations, features, means, or instructions for transmitting the second message over a time domain resource, a frequency domain resource, or a code domain resource that may be associated with collision indications for the first RAT and the second RAT.

Some examples of the method, apparatuses, and non-transitory computer-readable medium described herein may further include operations, features, means, or instructions for receiving, from the second UE, a third message indicating a request for resource information, where the second message may be transmitted based on the request.

Some examples of the method, apparatuses, and non-transitory computer-readable medium described herein may further include operations, features, means, or instructions for transmitting the second message may be based on a priority associated with the data message, a priority associated with the set of resources, a reference signal received power associated with the first message, or a combination thereof.

A method for wireless communications at a second UE is described. The method may include transmitting, to a first UE, a first message indicating a resource reservation for a sidelink message associated with a first RAT, receiving, from the first UE, a second message indicating a collision between the sidelink message and one or more resources associated with a second RAT, where the collision is based on the sidelink message and the one or more resources at least partially overlapping, and transmitting the sidelink message in accordance with the first RAT based on receiving the second message.

An apparatus for wireless communications at a second UE is described. The apparatus may include a processor, memory coupled with the processor, and instructions stored in the memory. The instructions may be executable by the processor to cause the apparatus to transmit, to a first UE, a first message indicating a resource reservation for a sidelink message associated with a first RAT, receive, from the first UE, a second message indicating a collision between the sidelink message and one or more resources associated with a second RAT, where the collision is based on the sidelink message and the one or more resources at least partially overlapping, and transmit the sidelink message in accordance with the first RAT based on receiving the second message.

Another apparatus for wireless communications at a second UE is described. The apparatus may include means for transmitting, to a first UE, a first message indicating a resource reservation for a sidelink message associated with a first RAT, means for receiving, from the first UE, a second message indicating a collision between the sidelink message and one or more resources associated with a second RAT, where the collision is based on the sidelink message and the one or more resources at least partially overlapping, and means for transmitting the sidelink message in accordance with the first RAT based on receiving the second message.

A non-transitory computer-readable medium storing code for wireless communications at a second UE is described. The code may include instructions executable by a processor to transmit, to a first UE, a first message indicating a resource reservation for a sidelink message associated with a first RAT, receive, from the first UE, a second message indicating a collision between the sidelink message and one or more resources associated with a second RAT, where the collision is based on the sidelink message and the one or more resources at least partially overlapping, and transmit the sidelink message in accordance with the first RAT based on receiving the second message.

Some examples of the method, apparatuses, and non-transitory computer-readable medium described herein may further include operations, features, means, or instructions for excluding the one or more resources from a set of available resources for the sidelink message based on the second message, where transmitting the sidelink message may be based on the excluded one or more resources.

Some examples of the method, apparatuses, and non-transitory computer-readable medium described herein may further include operations, features, means, or instructions for receiving, from the first UE, a third message indicating resource information for transmissions by the second UE based on the received second message, where the resource information indicates that a first subset of resources of a set of resources of a resource pool may be associated with the first RAT and a second subset of resources of the set of resources may be associated with the second RAT.

In some examples of the method, apparatuses, and non-transitory computer-readable medium described herein, receiving the second message may include operations, features, means, or instructions for receiving the second message over a time domain resource, a frequency domain resource, or a code domain resource that may be associated with collision indications for the first RAT and the second RAT.

Some examples of the method, apparatuses, and non-transitory computer-readable medium described herein may further include operations, features, means, or instructions for transmitting, to the first UE, a third message indicating a request for resource information, where the second message may be received based on the request.

DETAILED DESCRIPTION

Figure 1:
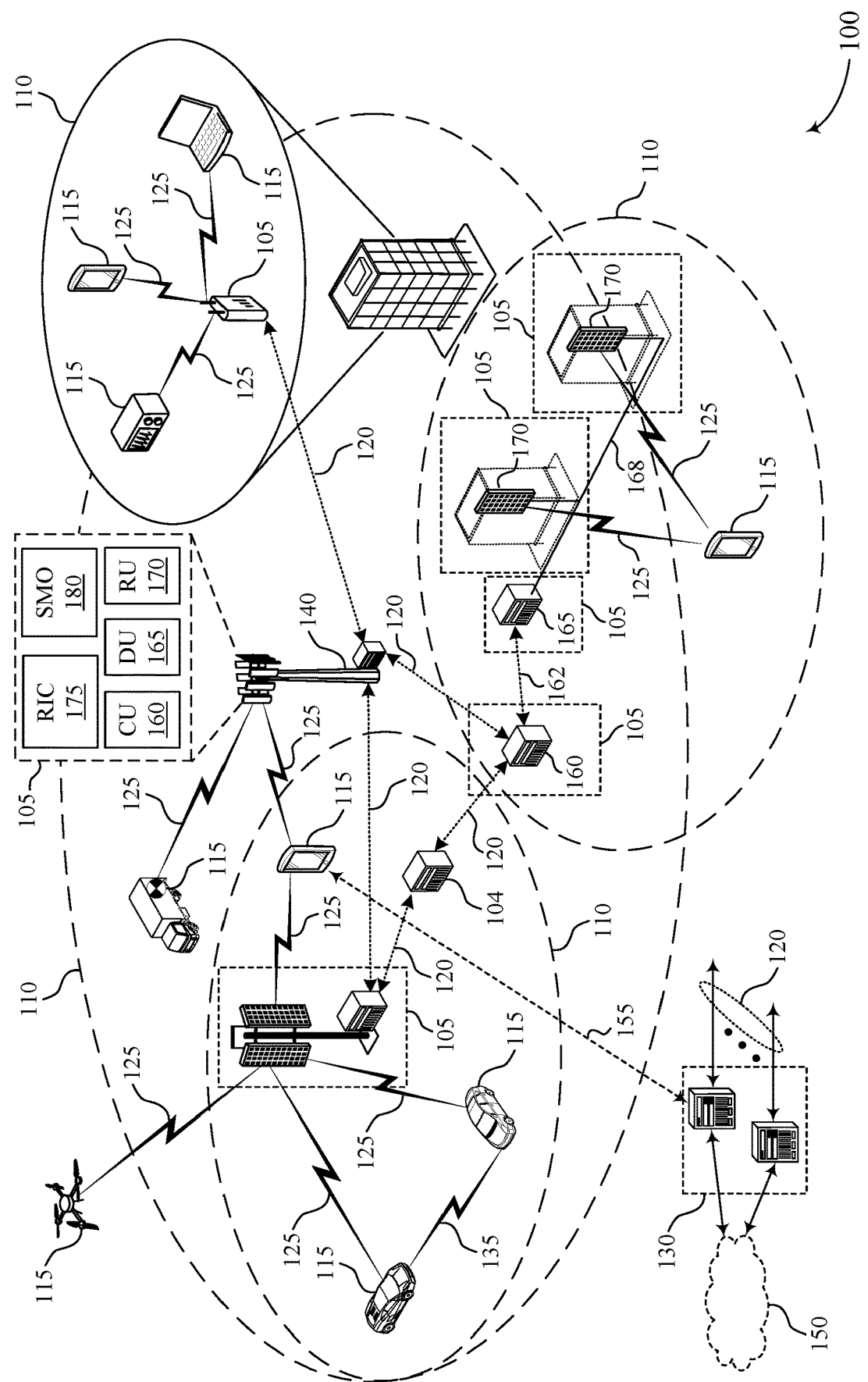
FIG. 1 illustrates an example of a wireless communications system that supports techniques for inter-user equipment (UE) coordination-based sidelink communications in accordance with one or more aspects of the present disclosure.

Some wireless communications systems may include communication devices, such as user equipments (UEs) or network entities, that support wireless communications using one or more radio access technologies (RATs). For example, the communication devices may support wireless communications using one or multiple cellular RATs, such as fourth generation (4G) systems (e.g., Long Term Evolution (LTE) systems), and fifth generation (5G) systems (e.g., New Radio (NR) systems), among other subsequent generations of cellular RATs.

Some communication devices may support a single RAT. For example, a first UE (e.g., a Type C UE) may communicate according to LTE procedures, and a second UE (e.g., a Type B UE) may communicate according to NR procedures. In other examples, a communication device (e.g., a Type A UE) may support communications according to multiple RATs, such as both LTE and NR. Further, wireless communications systems may support sidelink communications between two or more UEs (e.g., using one or more RATs).

Due to a relative scarcity of the radio frequency spectrum, NR devices and LTE devices may operate in a same channel. For example, NR sidelink communications and LTE sidelink communications may occur in the same or overlapping channels. In some examples, however, communication devices capable of supporting a single type of RAT may be incapable of decoding messages transmitted using another type of RAT. For example, an NR UE (e.g., a UE that supports NR communications for sidelink, a type B device) may not be able to decode LTE messages, and an LTE UE (e.g., a UE that supports sidelink LTE communications, a Type C device) may not be capable of decoding NR messages. Thus, the NR UE may be unaware of resources reserved by the LTE UE for LTE communications and, similarly, the LTE UE may be unaware of resources reserved for NR communications. In some examples, an inability of some communication devices to communicate regarding resources of a shared channel may lead to reduced resource utilization, increased interference, and an increased likelihood of transmission collisions. For instance, an NR transmission by the NR UE may occupy a same resource (e.g., time resource, frequency resource) as an LTE transmission by the LTE UE, resulting in degraded performance for one or both of the UEs.

Various aspects of the present disclosure, for example, relate to techniques for inter-device coordination between UEs (or other devices) that support different RATs and that operate in a same or overlapping channel. For example, a first UE (e.g., a Type A device) may be capable of supporting multiple RATs, such as LTE and NR. In such an example, the first UE may serve as an intermediary UE and perform inter-UE coordination between other UEs that support a single RAT. More specifically, the first UE may be capable of decoding resource reservation messages from both LTE UEs and NR UEs and, as such, may obtain resource information for a resource pool shared by the LTE UEs and the NR UEs. The first UE may transmit an inter-UE coordination (IUC) message to a second UE (e.g., an NR UE) that may indicate whether resources of the resource pool are available for NR transmissions by the second UE, are associated with or reserved for LTE communications, or the like. The second UE may select resources from the resource pool for a sidelink transmission based on the information included in the IUC message. For example, when selecting sidelink resources (e.g., from a pool of sidelink resources) for its own sidelink transmission, the second UE may determine whether to exclude resources associated with LTE communications to avoid interference with or collisions with the LTE communications.

Additionally, or alternatively, the first UE may transmit an IUC message to the second UE in the case of a collision between an NR transmission by the second UE and one or more LTE transmissions associated with one or more other UEs (e.g., LTE UEs). The first UE may detect such a collision based on determining that one or more resources reserved by the second UE for the NR transmission at least partially overlap with one or more LTE resources of the resource pool. The IUC message may include a collision indication. In some examples, the second UE may adjust or otherwise modify the reserved resources based on the collision indication. For instance, the second UE may refrain from using the reserved resources for the NR transmission and may instead select other resources from the resource pool. Additionally, or alternatively, the second UE may refrain from using resources associated with the collision for subsequent NR transmissions.

Techniques described herein may improve device coordination to reduce conflicts within sidelink resources. By transmitting some information related to reserved sidelink resources via IUC messages, techniques described herein may enable a channel (e.g., a sidelink channel) and corresponding resources to be shared by devices supporting different RATs. By enabling reservations of sidelink resources to be understood by UEs communicating via different RATs, for example, techniques described herein may reduce potential conflicts within sidelink resources, and may enable more efficient and reliable communications within a wireless communications system. As such, the use of IUC messages to indicate which sidelink resources are associated with a RAT, devices that support a limited quantity of RATs (e.g., one RAT), and are unable to decode transmissions that are sent in accordance with different RATs, may be able to identify which resources are reserved by other devices operating in accordance with those different RATs.

Aspects of the disclosure are initially described in the context of wireless communications systems. Aspects of the disclosure are further illustrated by and described with reference to apparatus diagrams, system diagrams, and flowcharts that relate to techniques for inter-UE coordination-based sidelink communications.

FIG. 1 illustrates an example of a wireless communications system 100 that supports techniques for inter-UE coordination-based sidelink communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for inter-UE coordination-based sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The wireless communications system 100 may accordingly support sidelink communications (e.g., V2X sidelink communications) between two or more UEs 115. In sidelink communications, multiple UEs 115 may access and utilize communication resources. A network entity 105 may select resources for sidelink communications between UEs 115 (e.g., "Mode 1" resource selection), or the UEs 115 may autonomously select resources for sidelink communications (e.g., "Mode 2" resource selection). To facilitate Mode 2 resource selection, the multiple UEs 115 may sense signaling from other UEs 115 and coordinate utilization of resources. For instance, each UE 115 may reserve resources for sidelink communications and may communicate such resource reservations to other UEs 115 via one or more sidelink control information (SCI) messages. The SCI messages may indicate reservation information (e.g., time (e.g., slot) and/or frequencies (e.g., subchannel) of the reserved resources), transmission priorities, and the like, among other examples.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, various devices of the wireless communications system 100 may operate using one or more different RATs. Additionally, due to some relative scarcity of radio frequency spectrum resources, different RATs may operate in the same wireless spectrum. For example, LTE-based sidelink communications and NR-based sidelink communications may use a shared (e.g., common) sidelink resource pool. The different RATs, however, may use some different techniques, which may impact the communications on the shared resources. For example, an NR device (e.g., an NR UE 115, which may be referred to as a Type B UE) may be incapable of decoding LTE communications (e.g., the NR device may exclude one or more components that facilitate decoding of transmissions sent using LTE techniques), and an LTE device (e.g., an LTE UE 115, which may be referred to as a Type C UE) may be incapable of decoding NR communications (e.g., the LTE device may exclude one or more components that facilitate decoding of transmissions sent using NR techniques). As such, some devices may not be able to identify when transmissions of the other RAT are to occur in the shared resource pool. That is, the NR device may be unable to decode messages (e.g., SCI, data) in which the LTE device indicates resource reservations for an upcoming LTE transmission. Likewise, the LTE device may not decode SCI transmissions from the NR device and may be unaware of resources of the shared resource pool that are reserved by the NR device for an upcoming NR transmission. Without coordination mechanisms, the NR device and the LTE device may inadvertently select (e.g., reserve) overlapping resources (e.g., time resources, frequency resources), thereby causing interference or a collision between the NR transmission and the LTE transmission.

Accordingly, aspects of the present disclosure are directed to techniques for inter-UE coordination-based sidelink communications. The techniques described herein enable sharing of resource information so that UEs of different RATs are aware of reservations of resources of a common resource pool. For the purposes of the present disclosure, a shared or common resource pool may be referred to or understood as a resource pool used for transmissions associated with different RATs in a same or overlapping spectrum band. Put another way, a common resource pool may be used by devices (e.g., UEs 115) operating according to respective RATs, such as the LTE device and the NR device. Additionally, some devices using the common resource pool may support more than one RAT. For example, a UE 115 may be an example of a Type A UE 115 that is capable of operating according to both NR and LTE and may use the resource pool for LTE transmissions, NR transmissions, or both.

Cochannel coexistence techniques described herein may include semi-static resource pool partitioning and dynamic resource sharing, among other examples, that facilitate coexistence of different RATs within a same channel (referred to as co-channel coexistence). When Type A UEs and Type B UEs coexist in a same or overlapping resource pool with other devices (e.g., legacy devices), such as Type C UEs (e.g., LTE-only UEs), such coordination techniques may be implemented via IUC messages.

In a first scheme (e.g., a resource avoidance scheme), an IUC message may support sharing of resource information between devices to aid in resource selection at a given device. For example, a first UE 115 may be a Type A UE that is capable of sensing resource reservation information from LTE and NR devices, such as a second UE 115 that is a Type B UE and a third UE 115 that is a Type C UE. The first UE 115 may forward resource reservations from the third UE 115 to the second UE 115 via an IUC message. That is, the first UE 115 may transmit an IUC message indicating resource reservation information for the resource pool to the second UE 115. The resource reservation information may indicate resources reserved for LTE transmissions, resources available for NR transmissions, a resource partition for the resource pool, a transmission resource set of the resource pool, or the like, based on sensing results obtained by the first UE 115. The second UE 115 may select resources from the resource pool for an NR transmission based on the resource reservation information, which may mitigate future collisions and avoid performance degradation.

In a second scheme, an IUC message may support conflict indications between resource reservations associated with different RATs. Here, the first UE 115 may indicate, via an IUC message to the second UE 115, that one or more resources of the resource pool reserved by the second UE 115 conflict (e.g., overlap) with one or more resources associated with LTE (e.g., one or more resources reserved by another UE 115, such as the third UE 115). In some cases, the first UE 115 may transmit the IUC message to indicate an upcoming (e.g., future) potential conflict between the reserved resources, and the second UE 115 may re-select resources to avoid the conflict. In other cases, the first UE 115 may transmit the IUC message to indicate a conflict that has already occurred (e.g., for a message transmitted by the second UE 115). In such cases, the second UE 115 may refrain from selecting or reserving the conflicting resources for future (e.g., subsequent) transmissions.

Figure 2:
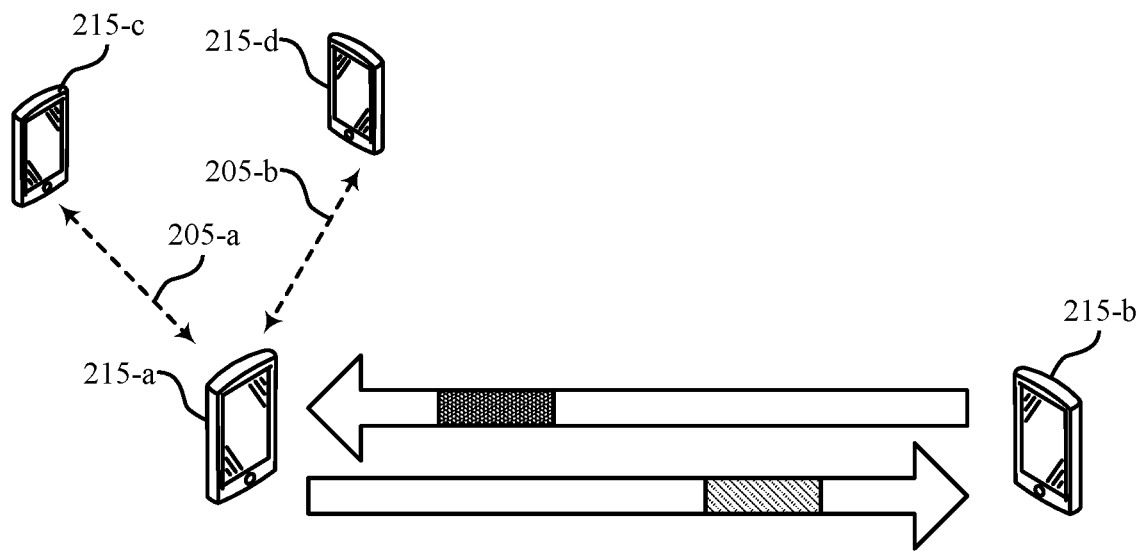
FIG. 2 illustrates an example of a wireless communications system that supports techniques for inter-UE coordination-based sidelink communications in accordance with one or more aspects of the present disclosure.

FIG. 2 illustrates an example of a wireless communications system 200 that supports techniques for inter-UE coordination-based sidelink communications in accordance with various aspects of the present disclosure. The wireless communications system 200 includes a UE 215-*a*, a UE 215-*b*, a UE 215-*c*, and a UE 215-*d*, which may be examples of the UEs 115 as described with respect to FIG. 1. FIG. 2 illustrates examples of sidelink communications between the UEs 215.

As described herein, due to scarcity of the wireless communications spectrum, NR communications and LTE communications may operate in a same channel, which may be associated with a resource pool. In some examples, the NR communications and LTE communications may be examples of sidelink communications, such as V2X sidelink communication. Here, an NR V2X device may be a dual-radio device such that the device transmits basic safety message (BSM) packets and coordinated automotive message (CAM) packets using LTE V2X procedures and transmits sensor traffic or other traffic using NR V2X procedures. In the absence of any coordination mechanism, NR transmissions may collide with LTE communications, as the communications may occupy the same time/frequency resources. As such, communications between devices may be degraded.

For example, the UEs 215 communicating via sidelink may reserve resources, which, in some examples, may be based on a mode of operation associated with the UEs 215, such as Mode-2 sidelink operations. A UE 215 may perform a resource reservation operation by selecting one or more resources of the resource pool to be used by the UE 215 for a future transmission. The UE 215 may indicate the selected (e.g., reserved) resources to other UEs 215 via SCI (e.g., a reservation announcement included in SCI) transmitted by the UE 215. Other UEs 215 sensing (e.g., receiving) the resource reservation may refrain from selecting or transmitting in the reserved resources. That is, a UE 215 may use resource reservations transmitted from other UEs 215 to determine one or more resources to refrain from using for sidelink communications.

However, a UE 215 that supports a single RAT, such as LTE, may not be able to decode resource reservations transmitted by UEs 215 that operate according to a different RAT, such as NR. In such examples, the UE 215 may be unaware of (e.g., incapable of identifying) resources of the resource pool reserved by NR UEs, and may be incapable of detecting and resolving collisions with the NR UEs. For example, the UE 215 may select resources of the resource pool for an LTE transmission that at least partially overlap with resources reserved by an NR UE for an NR transmission. The LTE transmission may collide or interfere with the NR transmission, thereby degrading performance and reliability of both the LTE transmission and the NR transmission. Accordingly, the present disclosure supports IUC techniques to facilitate co-channel coexistence and resource sharing among multiple RATs.

In the example of FIG. 2, the UE 215-*a* may be an example of a Type A UE that supports operations and communications according to multiple RATS, such as a first RAT (e.g., NR) and a second RAT (e.g., LTE). The UE 215-*a* may perform sensing of the resource pool to determine sensing and resource reservation information associated with the first RAT and the second RAT. For example, the UE 215-*a* may include an LTE component for sensing associated with LTE and an NR component for sensing associated with NR. More specifically, the LTE component may enable the UE 215-*a* to receive and decode resource reservations indicated by LTE devices, while the NR component may enable the UE 215-*a* to receive and decode resource reservations indicated by NR devices. In some cases, the LTE component and the NR component may exchange information (e.g., sensing and resource reservation information). For example, the LTE component may share sensing information associated with resource reservations indicated by LTE devices with the NR component to aid in resource selection at the NR component.

The UE 215-*b* and the UE 215-*d* may be examples of Type B UEs that communicate (e.g., operate) according to the first RAT (e.g., NR). The UE 215-*c* may be an example of a Type C UE that communicates (e.g., operates) according to the second RAT (e.g., LTE) (e.g., the Type C UE may only include sidelink components that operate in accordance with some earlier release of a wireless communications standard, such as third generation partnership project (3GPP) Release 14 and/or Release 15). Accordingly, FIG. 2 illustrates sidelink communications between the UE 215-*b* and the UE 215-*a*, and between the UE 215-*d* and the UE 215-*a*, using the first RAT (e.g., NR), and sidelink communications between the UE 215-*a* and the UE 215-*c* using the second RAT (e.g., LTE).

The UE 215-*a* may perform sensing of a sidelink channel including resources of the resource pool to determine a set of resources reserved by the UE 215-*b*, the UE 215-*c*, and/or the UE 215-*d*. For example, the UE 215-*a* may sense (e.g., receive, detect, identify) a sidelink message 205-*a* (which may include or be an example of SCI) transmitted by the UE 215-*c* indicating a first subset of resources reserved by the UE 215-*c* for a transmission (e.g., an LTE transmission) by the UE 215-*c*. The UE 215-*a* may sense or detect a sidelink message 205-*b* (which may include or be an example of SCI) transmitted by the UE 215-*d* indicating a second subset of resources reserved by the UE 215-*d* for a transmission (e.g., an NR transmission) by the UE 215-*d*.

Based on the sensing, the UE 215-*a* may determine resource information associated with the resource pool to share to one or more other UEs 215 (e.g., the UE 215-*b*, the UE 215-*c*, the UE 215-*d*) as part of an IUC message 225. The UE 215-*a* may transmit the IUC message 225 via a standalone manner via SCI (e.g., SCI-2) or via a MAC control element (MAC-CE), or may multiplex the IUC message 225 with data (e.g., NR data). The UE 215-*a* may transmit the IUC message 225 to the other UEs 215 to inform the other UEs 215 of resource reservations, resource conflicts, preferred resources, non-preferred resources, resource partitions, transmission resource sets, and the like, among other examples.

A UE 215 receiving the IUC message 225 may use the indicated resource information when performing resource reservations, for example, to determine resources to select/reserve for a future transmission. In some cases, the UE 215-*a* may transmit the IUC message 225 based on receiving a request for resource information. In the example of FIG. 2, the UE 215-*b* may transmit a request message 210 to the UE 215-*a* indicating a request for resource information to assist the UE 215-*b* in resource selection. The request message 210 may include or be an example of SCI or a MAC-CE. The UE 215-*a* may transmit the IUC message 225 to the UE 215-*b* in response to the request message 210.

In some examples, the resource information indicated in the IUC message 225 may be based on a resource pool partition or a transmission resource set, where the resource pool partition or the transmission resource set separates the resource pool, for example, into a first set of resources allocated for communications associated with a first RAT (e.g., NR communications, NR transmissions) and a second set of resources allocated for communications associated with a second RAT (e.g., LTE communications, LTE transmissions). For example, NR communications may access the channel in one or more TTIs (e.g., one or more slots) and LTE communications may access the channel in one or more other TTIs (one or more other slots). In another example, based on the transmission resource set, NR sidelink devices and LTE sidelink devices may transmit on mutually orthogonal resources but may receive packets or perform channel sensing across resources in the resource pool (e.g., all resources in the resource pool). The resource pool partition may be configured or preconfigured (e.g., in a static or semi-static manner), or may be dynamically determined and updated over time (e.g., by the UE 215-*a*). As described with reference to FIG. 3, the UE 215-*a* may indicate the resource partition or the transmission resource set via an index or a bitmap that corresponds to a resource map. The UE 215-*a* may indicate the resource partition or the transmission resource set in the IUC message 225 such that the UE 215-*b* selects resources from an appropriate portion of the resource pool, e.g., based on the RAT according to which the UE 215-*b* operates (e.g., NR).

Additionally, or alternatively, the UE 215-*a* may indicate resource reservation information in the IUC message 225 (e.g., in a resource avoidance scheme) based on RATs associated with respective resources of the resource pool and the RAT associated with the UE 215 receiving the IUC message 225. For example, the UE 215-*a* may indicate resources of the resource pool to be excluded from use by the UE 215-*b* (e.g., non-preferred resources) based on the UE 215-*b* operating according to NR, where the resources to be excluded are associated with LTE (e.g., are associated with LTE transmissions or reservations). In the example of FIG. 2, the UE 215-*a* may indicate that the UE 215-*b* is to exclude the first subset of resources based on the first subset of resources being associated with LTE and reserved by the UE 215-*c*. The UE 215-*a* may further indicate resources of the resource pool that are available for use by the UE 215-*b* (e.g., preferred resources), such as resources that are associated with NR or resources that are not associated with (e.g., reserved for) LTE. For instance, the UE 215-*a* may determine that the second subset of resources, though reserved by the UE 215-*d*, is associated with NR resources, and therefore may be used for other NR transmissions (e.g., after the transmission by the UE 215-*d*). Based on receiving the IUC message 225, the UE 215-*b* may reserve resources for a future transmission by excluding the non-preferred resources and selecting resources from the preferred resources.

In some instances, a conflict may occur between resource reservations of two or more of the UEs 215, such that the UE 215-*a* may include an indication of the conflict in the IUC message 225. For example, two or more UEs 215 may reserve overlapping communication resources, e.g., during the same time and/or over the same frequency range. The UE 215-*a* may determine, based on sensing the respective resource reservations, that a reservation from the UE 215-*c* includes one or more resources that overlap with one or more resources of the reservation from the UE 215-*d*. The UE 215-*a* may select one of the UE 215-*c* or the UE 215-*d* to transmit the IUC message 225 including the conflict indication to. For example, when the UEs 215-*c* and 215-*d* have different transmission priorities for the overlapping reserved resource, the UE 215-*a* may select to send the IUC message 225 to the UE 215 associated with a lower transmission priority. The UE 215 receiving the IUC message 225 including the conflict indication may select (e.g., reselect) and reserve a new resource (e.g., associated with a different time and/or frequency than the initial reservation) to avoid the conflict.

In other cases, the UE 215-*a* may transmit a conflict indication in the IUC message 225 after a conflict has occurred. Here, the UE 215-*a* may determine that a UE 215 associated with a first RAT has transmitted a sidelink message via one or more resources that overlap with one or more resources associated with a second RAT. For example, the UE 215-*a* may determine that the UE 215-*d* (e.g., associated with NR) has transmitted an NR message via a resource that was previously reserved by the UE 215-*c* for an LTE transmission. In another example, the UE 215-*a* may determine that the NR message was transmitted via a resource allocated for LTE transmissions, e.g., based on a resource partition for the resource pool, a transmission resource set, or both. In either case, the UE 215-*a* may indicate the collision to the UE 215-*d* by way of the IUC message 225, such that the UE 215-*d* may avoid selecting that resource for future NR messages.

The UE 215-*a* may include additional information in the IUC message 225 to enable the UE 215-*b* (e.g., or another receiving UE 215) to select resources of the resource pool in accordance with co-channel coexistence. In some examples, the UE 215-*a* may indicate a zone identifier (ID) associated with a zone of the UE 215-*a*, a group ID associated with a group to which the UE 215-*a* belongs, a periodicity with which applying the resource information, a periodicity with which the set of resources are reserved by the other UEs, a priority (e.g., a priority value or priority class) associated with one or more resources, a priority of a transmission associated with one or more resources (e.g., reserved resources), a priority of the IUC message 225, or a combination thereof.

The UE 215-*b* may apply the resource information based on such additional information. For example, the UE 215-*b* may select resources using the resource information according to an indicated periodicity. In another example, if the UE 215-*b* receives multiple IUC messages in addition to the IUC message 225, the UE 215-*b* may select an IUC message with a highest indicated priority and may use the corresponding resource information for resource selection. Additionally, or alternatively, the UE 215-*b* may apply resource information indicated by an IUC message if the IUC message is transmitted by a UE belonging to a same group as the UE 215-*b*, e.g., based on an indicated group ID.

Figure 3A:
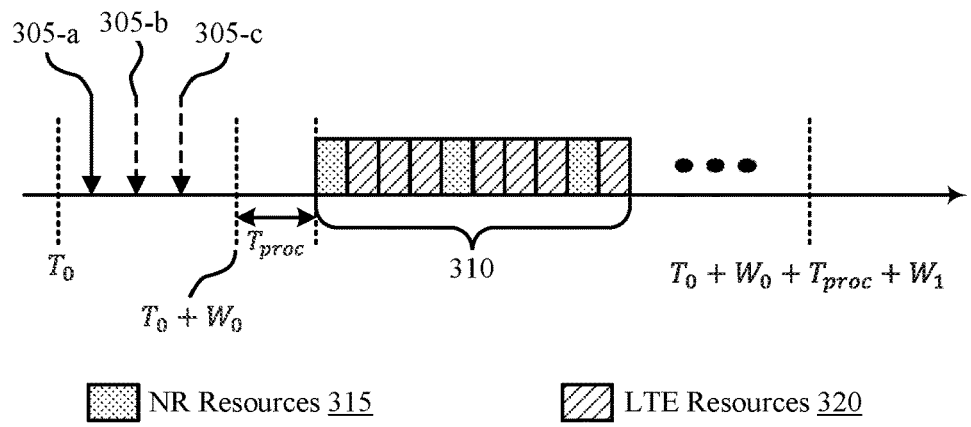
FIGS. 3A, 3B, and 3C illustrate examples of resource diagrams that support techniques for inter-UE coordination-based sidelink communications in accordance with one or more aspects of the present disclosure.
Figure 3B:
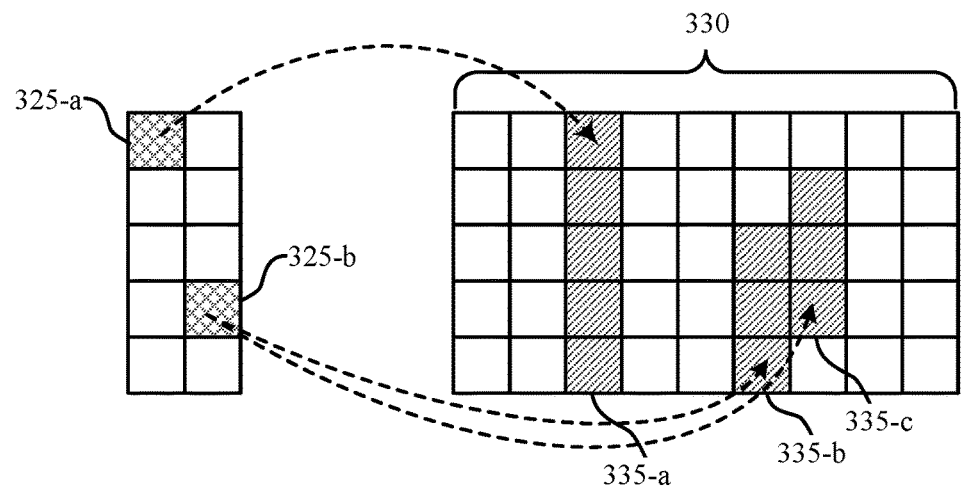
Figure 3C:
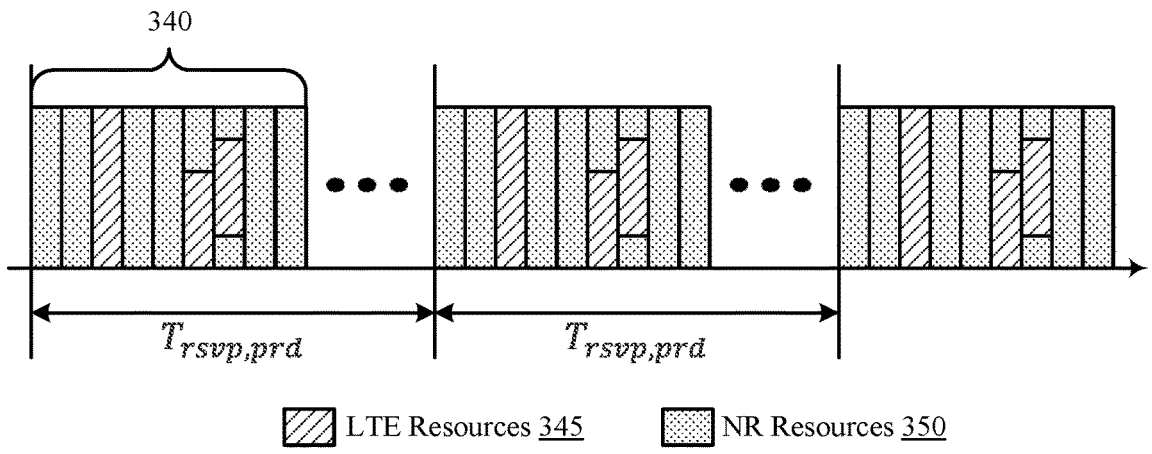

FIGS. 3A, 3B, and 3C illustrate examples of resource diagrams 301, 302, and 303, respectively, that support techniques for inter-UE coordination-based sidelink communications in accordance with various aspects of the present disclosure. The resource diagrams 301, 302, and 303 may be implemented by one or more UEs 115, as described with respect to FIGS. 1 and 2. For example, the resource diagrams 301, 302, and 303 illustrate example procedures for resource selection in a resource pool that is shared between a first RAT (e.g., NR) and a second RAT (e.g., LTE) different from the first RAT. A first UE that is capable of communicating according to both RATs may provide resource information (e.g., resource reservation information, resource partition information, conflict indications) to a second UE that is capable of communicating according to at least NR (or later) procedures. In some cases, the second UE may support a single RAT (e.g., NR), while in other cases, the second UE may also be capable of communicating according to both RATs (e.g., may be a Type A UE). The second UE may implement the techniques described with respect to FIGS. 3A, 3B, 3C, or some combination thereof, to identify and select communication resources in the shared resource pool.

As described with respect to FIG. 2, the first UE may sense (e.g., detect, receive, identify) sidelink messages indicating resource reservations for the resource pool and may determine a set of resources reserved by other UEs. Each resource of the set of resources may be associated with a respective RAT (e.g., LTE or NR), for example, based on the RAT supported by the UE reserving the resource(s). In some examples, the first UE may determine or otherwise identify a resource partition for the resource pool, such as a configured or pre-configured resource partition or a dynamic resource partition. In some examples, the resource partition may include or be an example of one or multiple transmission resource sets.

The first UE may transmit an IUC message to the second UE indicating resource information for the resource pool based on the sensing, the resource partition, or both. For example, the IUC message may indicate that a first subset of resources of the set of resources is associated with NR and a second subset of resources of the set of resources is associated with LTE. In some cases, the IUC message may further include an indication that the resource information indicates NR resources and LTE resources. The IUC message may indicate that the first subset of resources are preferred resources, are available for use by the second UE, or both. Additionally, the IUC message may indicate that the second subset of resources are non-preferred resources. In some examples, the IUC message may explicitly indicate one or more future resources, such as one or more non-preferred resources, that are to be excluded by the second UE. In such examples, the IUC message may further indicate that the resources are to be excluded as part of an LTE resource avoidance scheme.

In some examples, the IUC message may indicate a bitmap corresponding to available and unavailable resources of the resource pool. Additionally, or alternatively, the IUC message may include an indication of a transmission resource set or a resource partition that separates the resource pool into NR resources and LTE resources, such as an indication of a portion (e.g., a percentage, a fraction, a ratio) of resources available for NR, a portion (e.g., a percentage, a fraction, a ratio) or fraction of resources available for LTE, or both. For example, the transmission resource set or the resource partition may include or correspond to a set of resources associated with NR or with LTE. The indication may include or be an example of an index or a value that maps to a configured or pre-configured resource partition for the resource pool.

Additionally, or alternatively, the IUC message may indicate a zone ID associated with the first UE, a group ID associated with the first UE (e.g., associated with a group to which the first UE belongs), a priority of the IUC message, a priority associated with the second subset of resources (e.g., LTE resources), a priority associated with a transmission for which the second subset of resources is reserved, a priority associated with data that is multiplexed with the IUC message, or some combination thereof.

The second UE receiving the IUC message may apply the resource information during resource selection. For instance, the second UE may include or exclude resources from the resource pool in accordance with the resource information when determining a resource reservation for a transmission by the second UE. When the IUC message includes resource partition information, the second UE may select resources from the NR portion of the resource pool, may exclude resources associated with the LTE portion of the resource pool, or both. In some examples, the second UE may determine whether to apply the resource information based on an indicated priority. For instance, if the second UE determines that a priority associated with the second subset of resources is lower than a priority associated with the transmission by the second UE, the second UE may determine to discard the resource information. In some cases, the second UE may apply the resource information in combination with sensing results obtained by the second UE.

FIG. 3A illustrates an example in which the second UE receives, from the first UE, an IUC message 305-*a* indicating resource information for a set of resources 310 of the resource pool. The second UE may receive the IUC message 305-*a* within a first time interval that begins at a time $T_0$ and ends at a time $T_0+W_0$. After the time $T_0+W_0$, the second UE may process the IUC message 305-*a* to determine the resource information during a time $T_{proc}$.

The IUC message 305-*a* may indicate that the set of resources 310 includes the first subset of resources (e.g., NR resources 315) and the second subset of resources (e.g., LTE resources 320). Additionally, the IUC message 305-*a* may indicate a resource partition index k that corresponds to a ratio of LTE to NR resources. In some examples, the resource partition index k may also be referred to or understood as a transmission resource set index k that corresponds to a set of resources of a transmission resource set. During the time $T_{proc}$, the second UE may map the index k to a configured or pre-configured resource partition for the resource pool or to a transmission resource set. In some examples, the resource partition or transmission resource set may include or be an example of a resource map that indicates a RAT associated with each resource of the resource pool, e.g., in accordance with the ratio. A resource partition transmission resource set may be represented by a set of values [$m_0$, $m_1$, $m_2$ . . . $m_i$] where each value of in indicates a slot type and RAT corresponding to a respective resource. For instance, a value of 0 may correspond to an LTE full slot, a value of 1 may correspond to an NR full data slot, a value of 2 may correspond to an NR frequency division multiplexed half data slot, and a value of 3 may correspond to an NR full slot with a physical sidelink feedback channel (PSFCH). As shown in Table 1 below, different values of k may correspond to different resource partitions (e.g., resource maps) or transmission resource sets including respective sets of values.

TABLE 1

| k | Resource Partition/Transmission Resource Set Information |
|---|---|
| 0 | [1, 0, 0, 0, 0, 0, 0, 0, 0, 0, 3, 0, 0, 0, 0, 0, 0, 0, 0, 0] |
| 1 | [1, 0, 0, 0, 0, 0, 0, 0, 0, 0, 3, 0, 0, 0, 0, 0, 1, 0, 0, 0, 0, 0] |
| 2 | [1, 0, 0, 0, 2, 0, 0, 0, 1, 0, 3, 0, 0, 0, 0, 0, 2, 0, 0, 0, 2, 0] |
| 3 | [1, 0, 0, 0, 2, 0, 0, 0, 0, 0, 3, 0, 0, 0, 0, 0, 2, 0, 0, 0, 1, 0] |
| . | . |
| . | . |
| . | . |
| $k_i$ | [1, 0, 0, 1, 2, 0, 1, 0, 0, 0, 3, 0, 2, 0, 0, 1, 0, 0, 1, 0, 3] |

In the example of FIG. 3A, the IUC message 305-a may indicate that k=2, such that the second UE applies the resource partition or transmission resource set (e.g., resource map) from Table 1 associated with k=2. In some cases, Table 1 may represent or be an example of a look-up table accessed by the second UE to map the value of k to the corresponding resource partition or transmission resource set. Applying the resource partition or transmission resource set to the set of resources 310 may enable the second UE to determine that the first, fourth, and eighth slots of the set of resources 310 are NR slots, while the remaining slots of the set of resources 310 are LTE slots. Accordingly, the second UE may select from among the first, fourth, and eighth slots when performing a resource reservation.

In some cases, the second UE may receive multiple IUC messages, such as the IUC message 305-a, an IUC message 305-b, and an IUC message 305-c, and may select one or more of the IUC messages 305 to use for resource selection. In some examples, the second UE may combine the resource information indicated by each IUC message 305. For example, the second UE may exclude all of the resources indicated as LTE resources or non-preferred resources by the IUC messages 305. As another example, the second UE may combine resource partition information indicated by the IUC message 305-a and resource reservation information indicated by the IUC message 305-b.

In other cases, the second UE may determine an IUC message 305 to use based on information included in each IUC message 305, a respective reference signal received power (RSRP) associated with each IUC message 305, or the like. For example, the second UE may determine (e.g., measure) a respective RSRP value associated with each IUC message 305. A relatively higher RSRP value may indicate a relatively high reliability for the IUC message. Additionally, a relatively higher RSRP value may indicate that a UE transmitting the IUC message 305 is located relatively near to the second UE, which may, in turn, mean that the resource information within the IUC message 305 has a relatively high likelihood to be accurate for the second UE. Accordingly, the second UE may select the IUC message 305 associated with a highest RSRP. The second UE may discard or otherwise refrain from using resource information indicated by the remaining IUC messages 305.

As another example, the second UE may select an IUC message 305 based on a distance between the second UE and a UE transmitting the IUC message 305. For example, the second UE may select an IUC message 305 that indicates a zone ID that is the same as a zone ID associated with the second UE. Additionally, or alternatively, the second UE may select an IUC message 305 transmitted by a peer UE (e.g., a unicast peer UE) or a UE belonging to a same group as the second UE (e.g., as indicated by a group ID included in the IUC message 305). In some cases, the second UE may select an IUC message 305 based on whether the IUC message 305 includes resource reservation information or resource partition information. The second UE may be configured (e.g., preconfigured) to select IUC messages 305 that include resource reservation information (e.g., information about reserved resources, available resources, preferred resources, non-preferred resources, etc.) over IUC messages that indicate a resource partition, or vice versa.

In another example, the second UE may select an IUC message 305 based on an IUC message priority. For instance, each IUC message 305 may include an indication of a priority associated with the IUC message 305, and the second UE may select the IUC message 305 associated with a highest priority. When an IUC message 305 is multiplexed with data for the second UE, the IUC message 305 may additionally indicate a priority of the multiplexed data; here, the second UE may select an IUC message 305 based on the priority of the multiplexed data.

The second UE may apply resource information indicated in an IUC message, such as the IUC message 305-a, based on (e.g., within) one or more time intervals. For example, the second UE may be configured (or preconfigured) to apply resource information at fixed time intervals. Additionally, or alternatively, the second UE may determine whether to apply resource information for resource selection based on a time interval in which the corresponding IUC message 305 is received. In the example of FIG. 3A, the second UE may select from IUC messages 305 received within a first time interval [$T_0$, $T_0+W_0$]. For instance, the second UE may determine which IUC message(s) 305 to use during processing, e.g., during $T_{proc}$. After selecting one or more IUC messages 305, the second UE may apply the corresponding resource information for the set of resources 310 during a second time interval [$T_0+W_0+T_{proc}$, $T_0+W_0+T_{proc}+W_1$]. Any IUC messages received during the second time interval may be discarded. After the end of the second time interval, the second UE may apply resource information received in subsequent IUC messages 305.

FIG. 3B illustrates an example in which the second UE receives an IUC message 325-a and an IUC message 325-b indicating resource reservation information for a set of resources 330 of the resource pool. The IUC messages 325 may indicate which resources of the set of resources 330 are associated with LTE (e.g., are allocated or reserved for LTE transmissions). As illustrated, the IUC message 325-a indicates a first subset of resources 335-a of the set of resources 330, while the IUC message 325-b indicates a second subset of resources 335-b and a third subset of resources 335-c. The first subset of resources 335-a, the second subset of resources 335-b, and the third subset of resources 335-c may be referred to as LTE resources. For example, the first subset of resources 335-a, the second subset of resources 335-b, and the third subset of resources 335-c may correspond to resources reserved by other UEs (e.g., LTE UEs), or may correspond to a percentage of the resource pool allocated for LTE transmissions in accordance with a resource partition or a transmission resource set.

The second UE may select (e.g., reserve) resources from the set of resources 330 for a message (e.g., a data message) to be transmitted by the second UE based on the IUC messages 325. For example, the second UE may determine that the first subset of resources 335-a, the second subset of resources 335-b, and the third subset of resources 335-c are non-preferred resources to be excluded from available resources. Additionally, or alternatively, the second UE may determine a set of preferred resources or available resources based on the first subset of resources 335-a, the second subset of resources 335-b, and the third subset of resources 335-c.

In some cases, and as described with reference to FIG. 3A, the second UE may determine to use resource information from either the IUC message 325-a or the IUC message 325-b, e.g., based on respective RSRP values or other information included in each IUC message 325. Alternatively, the second UE may combine resource information from both IUC messages 325. For example, the IUC messages 325 may indicate that the first subset of resources 335-a, the second subset of resources 335-b, and the third subset of resources 335-c are non-preferred resources, such that the second UE may exclude the first subset of resources 335-a, the second subset of resources 335-b, and the third subset of resources 335-c from resource selection.

In some cases, the second UE may include or exclude resources from the set of resources 330 based on a priority associated with resources indicated by a corresponding IUC message. For example, the IUC message 325-a may indicate a priority associated with the first subset of resources 335-a or with a transmission for which the first subset of resources 335-a is reserved. If the indicated priority is relatively lower than a priority of the message to be transmitted by the second UE, the second UE may include the first subset of resources 335-a in the resource selection (e.g., the second UE may not exclude the first subset of resources 335-a). Alternatively, if the indicated priority is relatively higher than the priority of the message to be transmitted by the second UE, the second UE may exclude the first subset of resources 335-a.

FIG. 3C illustrates an example in which the second UE applies resource information according to a periodicity $T_{rsvp,prd}$. The second UE may receive an IUC message indicating resource information for a set of resources 340 and indicating the periodicity $T_{rsvp,prd}$ for applying the resource information. The resource information may indicate that the set of resources 340 includes LTE resources 345 and NR resources 350. In some examples, the resource information may include a bitmap that indicates locations of the LTE resources 345 and the NR resources 350 within the resource pool. The LTE resources 345 may correspond to a subset of resources reserved by other UEs and may be considered or indicated as unavailable resources for the second UE.

The second UE may apply the resource information to select resources for a subsequent transmission in accordance with the periodicity $T_{rsvp,prd}$. For example, in a given period, the second UE may exclude the indicated LTE resources 345 and may select resources for the transmission from among the NR resources 350. The second UE may repeatedly apply the resource information for subsequent resource selection according to the periodicity $T_{rsvp,prd}$.

Figure 4A:
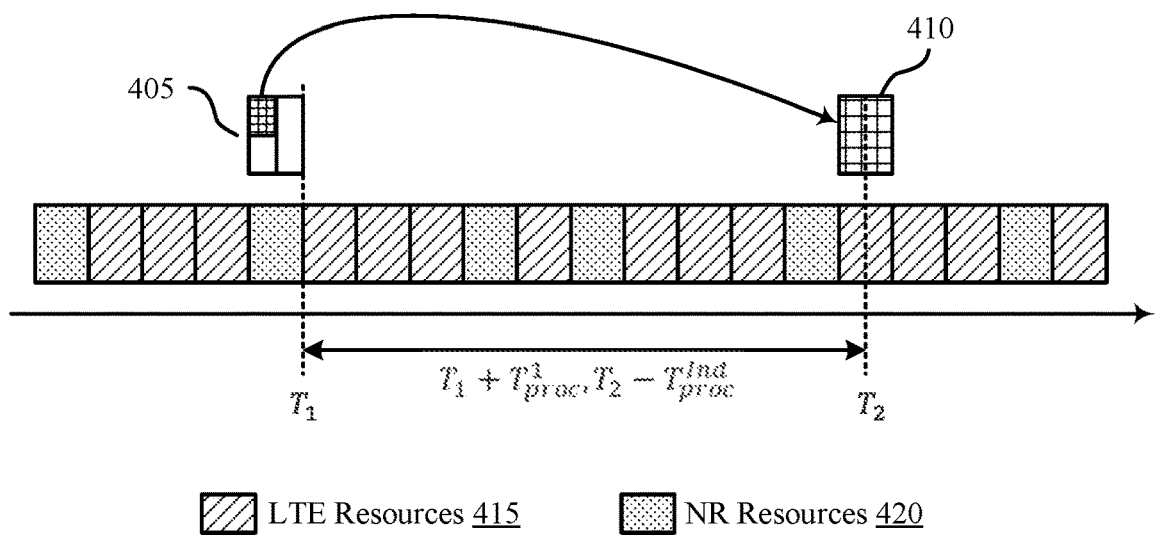
FIGS. 4A and 4B illustrate examples of resource diagrams that support techniques for inter-UE coordination-based sidelink communications in accordance with one or more aspects of the present disclosure.
Figure 4B:
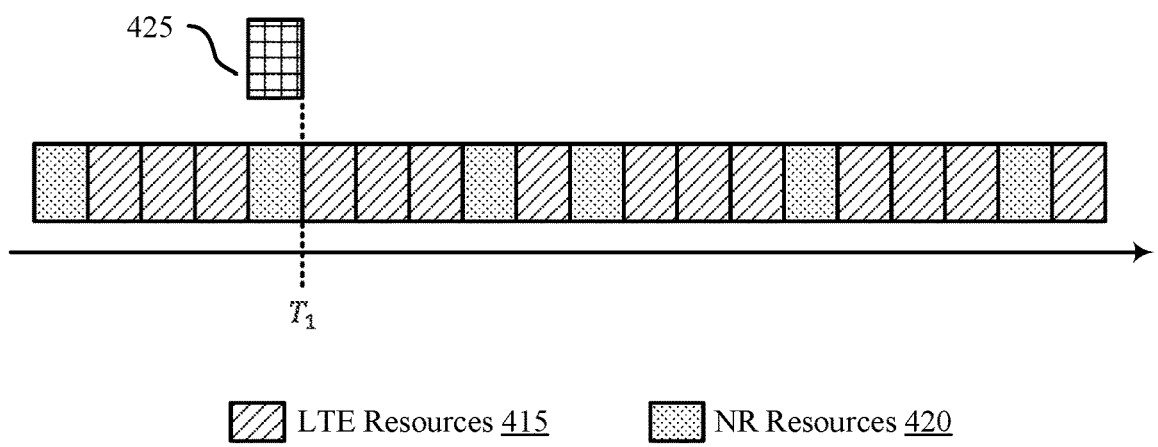

FIGS. 4A and 4B illustrate examples of resource diagrams 401 and 402, respectively, that support techniques for inter-UE coordination-based sidelink communications in accordance with various aspects of the present disclosure. The resource diagrams 401 and 402 may be implemented by one or more UEs 115, as described with respect to FIGS. 1 and 2. For example, the resource diagrams 401 and 402 illustrate example procedures for resource selection in a resource pool that is shared between a first RAT (e.g., NR) and a second RAT (e.g., LTE) different from the first RAT. A first UE that is capable of communicating according to at least the first RAT may provide resource information (e.g., resource reservation information, resource partition information, conflict indications) to a second UE that is capable of communicating according to at least NR (or later) procedures. In some cases, the first UE, the second UE, or both may support a single RAT (e.g., NR), while in other cases, the first UE, the second UE, or both may be capable of communicating according to both RATs. The second UE may implement the techniques described with respect to FIGS. 4A, 4B, or some combination thereof, to identify and select communication resources in the shared resource pool.

As described with respect to FIG. 2, the first UE may sense (e.g., detect or receive) sidelink messages indicating resource reservations for the resource pool and may determine a set of resources reserved by other UEs. Each resource of the set of resources may be associated with a respective RAT (e.g., LTE or NR), e.g., based on the RAT supported by the UE reserving the resource(s). The first UE may additionally receive a message (e.g., SCI) from the second UE indicating a resource reservation for a data message (e.g., an NR message) to be transmitted by the second UE. Based on the sensing and the message received from the second UE, the first UE may determine that a collision (e.g., conflict) between the data message and one or more resources (e.g., of the set of resources) associated with LTE is imminent or has already occurred. The collision may be an expected or potential collision based on an overlap (e.g., a partial overlap, a full overlap) between the one or more resources associated with LTE and one or more resources reserved for the data message. The first UE may transmit an IUC message to the second UE including an indication of the collision, which may be referred to as a conflict indication, a collision indication, or the like.

The IUC message may include or be an example of SCI (e.g., SCI-2) or a MAC-CE. In some cases, the first UE may transmit the IUC message via a feedback channel, such as a PSFCH. Additionally, or alternatively, the first UE may transmit the IUC message based on a dedicated resource. For example, the first UE may transmit the conflict indication of the IUC message via a resource (e.g., a time resource, a frequency resource, a code domain resource) dedicated to indicating conflicts for (e.g., between) the first RAT and the second RAT. The dedicated resource may be different than a resource used to indicate conflicts for a single RAT (e.g., the first RAT or the second RAT).

In some cases, the first UE may determine that the second UE is a Type B UE based on the collision. That is, the first UE may infer that the second UE is a Type B UE and is incapable of sensing LTE resource reservation information based on the second UE reserving resources associated with LTE transmissions. In other cases, the second UE may request (e.g., as part of the message indicating the resource reservation or as part of a prior transmission) resource information from the first UE. Here, the first UE may determine that the second UE is a Type B UE, and may transmit the IUC message including the resource information or conflict indication, in response to the request.

In some examples, the first UE may determine whether to transmit a conflict indication to the second UE based on a priority associated with the data message and a priority associated with an LTE transmission for which the one or more resources are reserved. For instance, the second UE may indicate, as part of the message indicating the resource reservation, the priority associated with the data message. If the priority associated with the data message is lower than or equal to the priority associated with the LTE transmission, the first UE may transmit the conflict indication to the second UE so that the second UE may refrain from using the conflicted resources. However, if the priority of the data message is higher than the priority associated with the LTE transmission, the first UE may not transmit the conflict indication.

Additionally, or alternatively, resources in the resource pool may be configured (e.g., preconfigured) with a priority based on the corresponding RAT. That is, LTE traffic may be associated with a first priority and NR traffic may be associated with a second priority. Accordingly, resources of the resource pool allocated for LTE transmissions may be associated with the first priority, while resources of the resource pool allocated for NR transmissions may be associated with the second priority. The first UE may transmit the conflict indication if the second priority is relatively lower than or equal to the first priority, but the first UE may refrain from transmitting the conflict indication if the second priority is higher than the first priority.

In some cases, the first UE may determine whether to transmit a conflict indication to the second UE based on an RSRP of the message indicating the resource reservation for the data message. For example, if the RSRP of the message satisfies (e.g., is greater than) a configured threshold, the first UE may transmit the conflict indication. In some examples, the first UE may transmit the conflict indication to the second UE if the second UE is a peer UE or belongs to a same group as the first UE.

FIG. 4A illustrates a scenario in which the first UE transmits the IUC message before the collision has occurred, where the conflict indication may be referred to as a pre-collision conflict indication. The resource pool may include LTE resources 415 and NR resources 420. The second UE may transmit, and the first UE may receive, a message 405 at a time $T_1$. The message 405, which may include or be an example of SCI, indicating a resource reservation for a data message 410 to be transmitted at a time $T_2$.

The first UE may determine that a resource reserved for the data message 410 overlaps (e.g., partially or fully) in the time domain, the frequency domain, or both with an LTE resource of the LTE resources 415. In some examples, the LTE resource may be reserved by another UE (e.g., a third UE) for an LTE transmission, while in other examples, the LTE resource may merely be allocated for LTE use (but may not have an active reservation). Accordingly, the first UE may transmit the IUC message including the pre-collision conflict indication at any time before $T_2$. More specifically, the first UE may transmit the IUC message within a time window $[T_1+T_{proc}^1, T_2-T_{proc}^{ind}]$, where $T_{proc}^1$ includes a processing time for the first UE to determine or identify the collision and transmit the IUC message and $T_{proc}^{ind}$ includes a processing time for the second UE to receive and process the IUC message.

Based on receiving the conflict indication, the second UE may determine to select (e.g., reselect) one or more other resources for the data message 410 to avoid overlap with the LTE resource and a potential collision with an LTE transmission. The second UE may, for example, drop or discard the resource reservation originally intended for the data message 410 and may select a new resource to reserve for the data message 410. In some cases, the collision may trigger the first UE to transmit resource information to the second UE via one or more subsequent IUC messages, and the second UE may select the new resource based on the resource information. For example, the first UE may transmit a subsequent IUC message indicating or otherwise identifying the NR resources 420, the LTE resources 415, or both, and the second UE may select the new resource from the NR resources 420.

FIG. 4B illustrates a scenario in which the first UE transmits the IUC message after the collision has occurred, where the conflict indication may be referred to as a post-collision conflict indication. Here, the second UE may transmit, and the first UE may receive, a data message 425 at a time $T_1$. The first UE may determine that the data message 425 was transmitted via a resource that overlaps (e.g., partially or fully) in the time domain, the frequency domain, or both with an LTE resource of the LTE resources 415. The first UE may transmit the IUC message within a time window $[T_1+T_{proc}^1, T_1+T_{win}^1]$ that is based on the processing time of the first UE. The second UE may utilize the IUC message (e.g., the conflict indication) for future resource selection procedures to avoid further conflict with the LTE resource.

Figure 5:
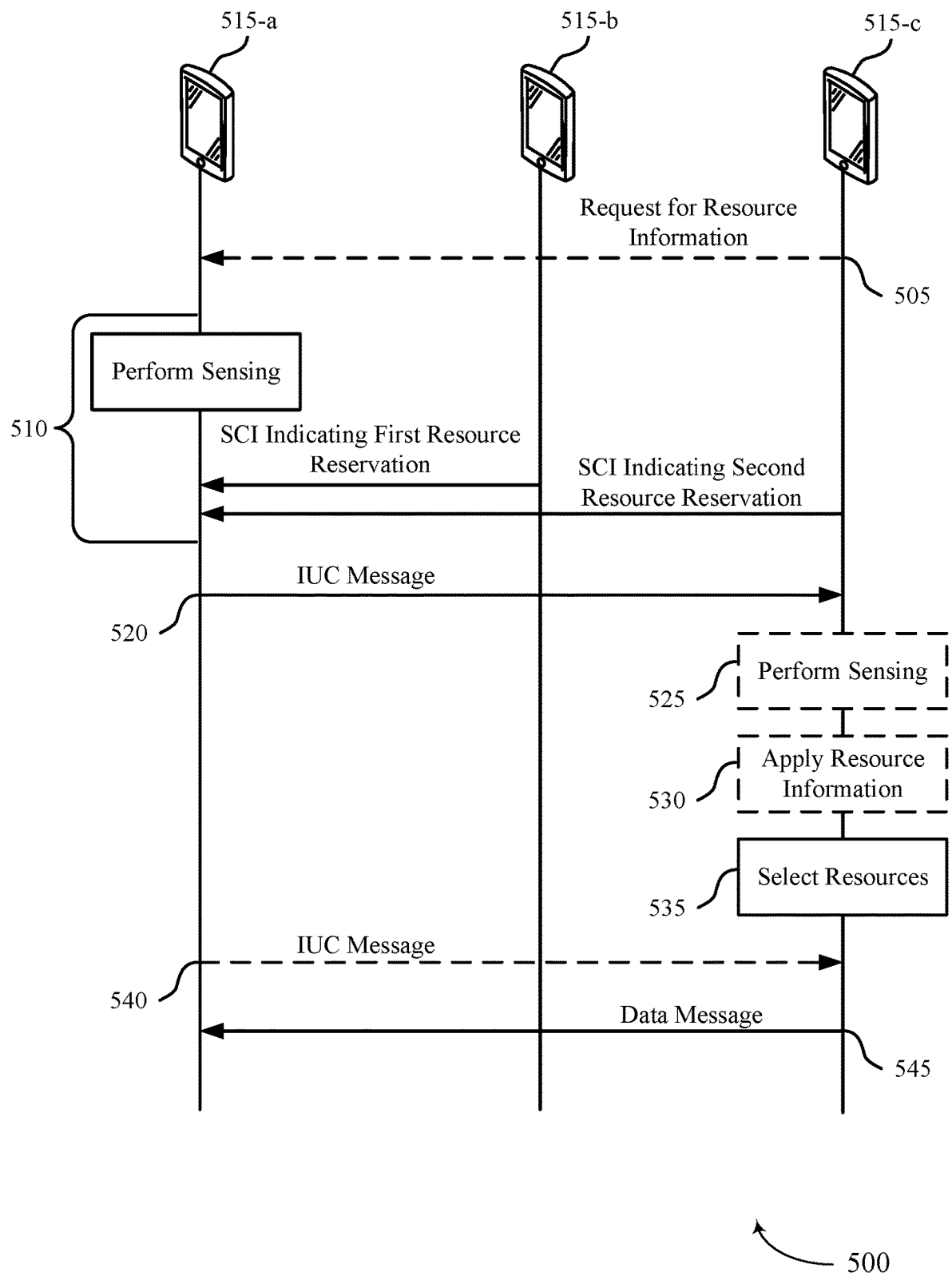
FIGS. 5 and 6 illustrate examples of process flows that support techniques for inter-UE coordination-based sidelink communications in accordance with one or more aspects of the present disclosure.

FIG. 5 illustrates an example of a process flow 500 that supports techniques for inter-UE coordination-based sidelink communications in accordance with various aspects of the present disclosure. The process flow 500 may include a UE 515-a, a UE 515-b, and a UE 515-c, which may be examples of UEs 115 as described herein. In the following description of the process flow 500, communications between the UE 515-a, the UE 515-b, and the UE 515-c may be transmitted in a different order than the example order shown, or the operations performed by the UE 515-a, the UE 515-b, and the UE 515-c may be performed in different orders or at different times. Some operations may also be omitted from the process flow 500, and other operations may be added to the process flow 500.

The process flow 500 may be an example of an inter-UE coordination procedure, such as a scheme 1-based resource avoidance procedure. In the process flow 500, the UE 515-a may be an example of a Type A UE (e.g., a UE that supports wireless communications via multiple RATs, such as LTE and NR, or some other RATs associated with future releases of a wireless communications standard) that includes an LTE sidelink module and an NR sidelink module and supports LTE and NR communications. The UE 515-b may be an example of a Type C UE (e.g., a UE that supports wireless communications via a single RAT, such as LTE) that includes an LTE sidelink module and communicates according to LTE procedures (e.g., and is not capable of NR communications). The UE 515-c may be an example of a Type B UE (e.g., a UE that supports wireless communications via a single RAT, such as NR) that includes an NR module and is capable of communicating according to NR procedures. The UE 515-a may be capable of sensing procedures performed to obtain sensing information associated with a resource pool shared amongst the UE 515-a, the UE 515-b, and the UE 515-c. The resource pool may be used for both LTE and NR communications. Additionally, although the process flow 500 describes an example of sidelink communications amongst the UE 515-*a*, the UE 515-*b*, and the UE 515-*c*, it is to be understood that other types of communications and devices may perform the techniques described herein.

At 505, the UE 515-*c* may optionally transmit, and the UE 515-*a* may receive, a message indicating a request for resource information. The request for resource information may include or be an example of a request for coordination information such as an IUC message.

At 510, the UE 515-*a* may perform sensing to obtain sensing and resource reservation information for the resource pool. The resource pool may be associated with one or more channels (e.g., sidelink channels). The UE 515-*a* may perform the sensing to determine a set of resources of the resource pool that are reserved by other UEs (e.g., including the UE 515-*b* and the UE 515-*c*). For example, the UE 515-*a* may perform sensing of one or more sidelink messages transmitted by one or more other UEs, each sidelink message indicating a respective subset of resources of the set of resources of the resource pool that are reserved by the transmitting UE for sidelink communications via a channel (e.g., a sidelink channel). The UE 515-*a* may determine that respective resources of the set of resources (e.g., respective subsets of resources of the set of resources) are associated with LTE or NR.

In some examples, sensing of sidelink communications may include the UE 515-*a* monitoring one or more sidelink channels for transmissions by other UEs. Here, the UE 515-*a* may use a transceiver to listen for the transmissions from the other UEs. Based on the monitoring, the UE 515-*a* may, for example, receive, from one or more UEs one or more sidelink messages that respectively indicate corresponding resource reservations for sidelink transmissions. As an example, the UE 515-*a* may receive, from the UE 515-*b*, a sidelink message (e.g., SCI) indicating a first resource reservation for a first one or more resources of the resource pool. The first one or more resources may be associated with LTE (e.g., based on the UE 515-*b* being a Type C UE). That is, the first one or more resources may be reserved by the UE 515-*b* for an LTE transmission by the UE 515-*b* via the channel. In some cases, the UE 515-*b* may indicate a priority of the LTE transmission as part of the sidelink message.

Additionally, performing sensing may include the UE 515-*a* receiving, from the UE 515-*c*, a sidelink message (e.g., SCI) indicating a second resource reservation for a second one or more resources of the resource pool. The second one or more resources may be associated with NR (e.g., based on the UE 515-*c* being a Type B UE) and may be reserved by the UE 515-*c* for an NR transmission by the UE 515-*c* via the channel. In some cases, the UE 515-*c* may indicate a priority of the NR transmission as part of the sidelink message.

The UE 515-*a* may determine resource information associated with the resource pool based on a result of the sensing (e.g., based on determining the set of resources reserved by at least the UE 515-*b* and the UE 515-*c*). The resource information may be for the UE 515-*c*, e.g., for NR transmissions by the UE 515-*c*. The resource information may include resource reservation information, resource partition information, or a combination thereof. In some examples, the resource reservation information may include one or more preferred resources of the set of resources, one or more non-preferred resources of the set of resources, or a combination thereof, for the UE 515-*c* (e.g., for the NR transmissions by the UE 515-*c*). In some examples, the one or more non-preferred resources may correspond to (e.g., include) the first one or more resources associated with LTE and reserved by the UE 515-*b*, while the one or more preferred resources may include the second one or more resources associated with NR and reserved by the UE 515-*c*. Additionally, or alternatively, the UE 515-*a* may exclude the one or more non-preferred resources to determine the one or more preferred resources. In some cases, the resource partition information may include a transmission resource set, a fraction (e.g., a ratio, a percentage) of resources of the set of resources that are available for NR, a fraction (e.g., a ratio, a percentage) of resources of the set of resources that are available for LTE, or a combination thereof.

At 520, the UE 515-*a* may transmit, and the UE 515-*c* may receive, a message (e.g., an IUC message) indicating the resource information determined at 510. The IUC message may include or be an example of a MAC-CE or SCI (e.g., SCI-2). In some examples, the UE 515-*a* may multiplex the IUC message with NR data for the UE 515-*c*. In some cases, the UE 515-*a* may transmit the IUC message at 515 based on receiving the request for resource information from the UE 515-*c* at 505.

The resource information may be for the transmissions by the UE 515-*c* (e.g., for NR transmissions) and may indicate whether respective resources of the resource pool are associated with LTE or NR. For example, the UE 515-*a* may indicate resource reservation information as part of the resource information. Here, the UE 515-*a* may indicate that a first subset of resources of the set of resources are associated with NR and a second subset of resources of the set of resources are associated with LTE. In some cases, the IUC message may further include an indication that the resource information indicates the RAT associated with each resource. For instance, the IUC message may indicate that the resource information (e.g., the resource reservation information) indicates NR or LTE resources (e.g., potential NR or potential LTE resources).

Additionally, the UE 515-*a* may indicate, as part of the resource information (e.g., the resource reservation information), resources to be excluded from available resources for the transmissions by the UE 515-*c* (e.g., NR transmissions), resources that are available for the transmissions by the UE 515-*c* (e.g., NR transmissions) or both. For example, the UE 515-*a* may indicate that the second subset of resources is to be excluded from the available resources based on the second subset of resources being associated with LTE, may indicate that the first subset of resources is to be included in the available resources based on the first set of subset of resources being associated with NR, or both. In some examples, the UE 515-*a* may further indicate that the resource exclusion is for LTE resource avoidance.

In some cases, the UE 515-*a* may indicate the one or more non-preferred resources, which may include or be an example of the resources (e.g., future resources) to be excluded from available resources for the transmissions by the UE 515-*c*. The one or more non-preferred resources may include the second subset of resources based on the second subset of resources being associated with LTE. In some examples, the UE 515-*a* may further indicate one or more preferred resources, which may include or be an example of the resources that may be used by the UE 515-*c*

Additionally, or alternatively, the UE 515-*a* may transmit, as part of the resource information (e.g., within the IUC message), an indication of a resource partition (e.g., a transmission resource set) for the resource pool. The resource partition may separate the resource pool into the first subset of resources (e.g., associated with LTE) and the second subset of resources (e.g., associated with NR) by indicating a fraction (e.g., a ratio, a percentage) of resources of the resource pool that are allocated for NR transmissions, a fraction (e.g., a ratio, a percentage) of resources of the resource pool that are allocated for LTE transmissions, or a combination thereof. In some examples, the indication of the resource partition may include one or more indexes, such as a first index corresponding to the fraction of resources allocated for NR transmissions, a second index corresponding to the fraction of resources allocated for LTE transmissions, or both. In other examples, the indication of the resource partition may include a bitmap that indicates resources of the resource pool that are available for use by the UE 515-c, resources of the resource pool that are unavailable for use by the UE 515-c, or both.

In some cases, the UE 515-a may indicate additional information within the IUC message, such as a periodicity for applying the resource information of the IUC message, a periodicity with which the set of resources are reserved by the other UEs, a zone ID associated with the UE 515-a, a group ID associated with the UE 515-a, the priority associated with the LTE transmission, a priority associated with the second subset of resources, or a combination thereof. For example, the IUC message may indicate a periodicity according to which the UE 515-c is to apply the resource reservation information, a periodicity according to which the UE 515-c is to apply the resource partition information, or a combination thereof. In some examples, the priority associated with the LTE transmission may be indicated by a priority value or a priority class.

At 525, the UE 515-c may optionally perform sensing of the resource pool. Based on the capabilities of the UE 515-c (e.g., based on the UE 515-c being a Type B UE associated with NR), the UE 515-c may only be able to determine (e.g., sense, receive) resource reservations from other NR UEs and may be unaware of resources reserved by LTE UEs, such as the UE 515-b.

At 530, the UE 515-c may determine if or when to apply the resource information indicated by the IUC message received at 515. The UE 515-c may determine that all or a portion of the IUC message is to enable coexistence with LTE sidelink communications. The UE 515-c may determine whether to apply the resource information based on information indicated in the IUC message, such as the priority associated with the LTE transmission or the second subset of resources, the zone ID, the group ID, or a combination thereof. If the UE 515-c determines to apply the resource information, the UE 515-c may use the resource information during resource selection (e.g., at 530). If, however, the UE 515-c determines not to apply the resource information, the UE 515-c may drop or discard the resource information.

For example, the UE 515-c may determine to apply the resource information if the priority associated with the LTE transmission or the second subset of resources is higher than a priority associated with a message (e.g., an NR message) to be transmitted by the UE 515-c. In some cases, the UE 515-c may apply the resource information if the UE 515-c is an intended recipient of the IUC message, if the UE 515-a is a peer UE, or if the UE 515-a is relatively near to the UE 515-c. That is, the UE 515-c may apply the resource information if the indicated group ID or zone ID is the same as a group ID or a zone ID associated with the UE 515-c. In another example, the UE 515-c may measure an RSRP associated with the IUC message and may apply the resource information if the RSRP satisfies a threshold, which may indicate that the UE 515-a is relatively close (e.g., geographically) to the UE 515-c.

Additionally, or alternatively, if the IUC message indicates a periodicity for applying the resource information (e.g., the periodicity for applying resource reservation information, the periodicity for applying the resource partition, or both), the UE 515-c may determine to apply the resource information according to the indicated periodicity. In some examples, the UE 515-c may apply the resource information based on receiving the IUC message within a first time interval.

At 535, the UE 515-c may select one or more resources for a data message to be transmitted by the UE 515-c. For example, the UE 515-c may select the one or more resources based on the IUC message indicating a periodicity for applying the resource information, a periodicity with which the set of resources are reserved by the other UEs, the zone ID, the group ID, the priority associated with the second subset of resources, or a combination thereof. The UE 515-c may exclude or include resources from the resource pool based on the resource information and the IUC message.

For example, the UE 515-c may exclude at least one resource of the second subset of resources from the resource pool based on the second subset of resources being associated with LTE, based on the IUC message indicating that the second subset of resources is to be excluded (e.g., that the second subset of resources are non-preferred resources), or both. Additionally, or alternatively, the UE 515-c may include at least one resource of the first subset of resources in the resource pool based on the first subset of resources being associated with NR, based on the IUC message indicating that the first subset of resources is to be included (e.g., that the first subset of resources are preferred resources), or both.

In some cases, the UE 515-c may select the one or more resources based on a resource partition (e.g., a transmission resource set) indicated by the IUC message. For example, if the indication of the resource partition includes one or more indexes (e.g., one or more resource partition indexes, one or more transmission resource set indexes), the UE 515-c may map the one or more indexes (e.g., respective values of the one or more indexes) to a resource partition or a transmission resource set (e.g., via a look-up table). The UE 515-c may exclude one or more resources associated with LTE, and may select the one or more resources from resources associated with NR, based on the resource partition or the transmission resource set and the mapping.

In some examples, the UE 515-c may select the one or more resources based on a bitmap indicated by the IUC message. The bitmap may indicate resources of the resource pool that are available for the transmissions by the UE 515-c, resources of the resource pool that are unavailable for the transmissions by the UE 515-c, or both. The UE 515-c may exclude the unavailable resources from the resource pool, and may include the available resources in the resource pool, based on the bitmap.

The UE 515-c may, in some cases, exclude at least one resource of the second subset of resources from the resource pool based on a priority associated with the second subset of resources, a priority associated with the data message, an RSRP associated with the IUC message, or a combination thereof. For example, if the priority associated with the data message is less than the priority associated with the second subset of resources, the UE 515-c may exclude the second subset of resources.

At 540, the UE 515-c may receive an additional IUC message from the UE 515-a during a second time interval subsequent to the first time interval. The UE 515-*c* may drop or discard the additional IUC message based on receiving the additional IUC message during the second time interval.

At 545, the UE 515-*c* may transmit the data message via the selected one or more resources.

Figure 6:
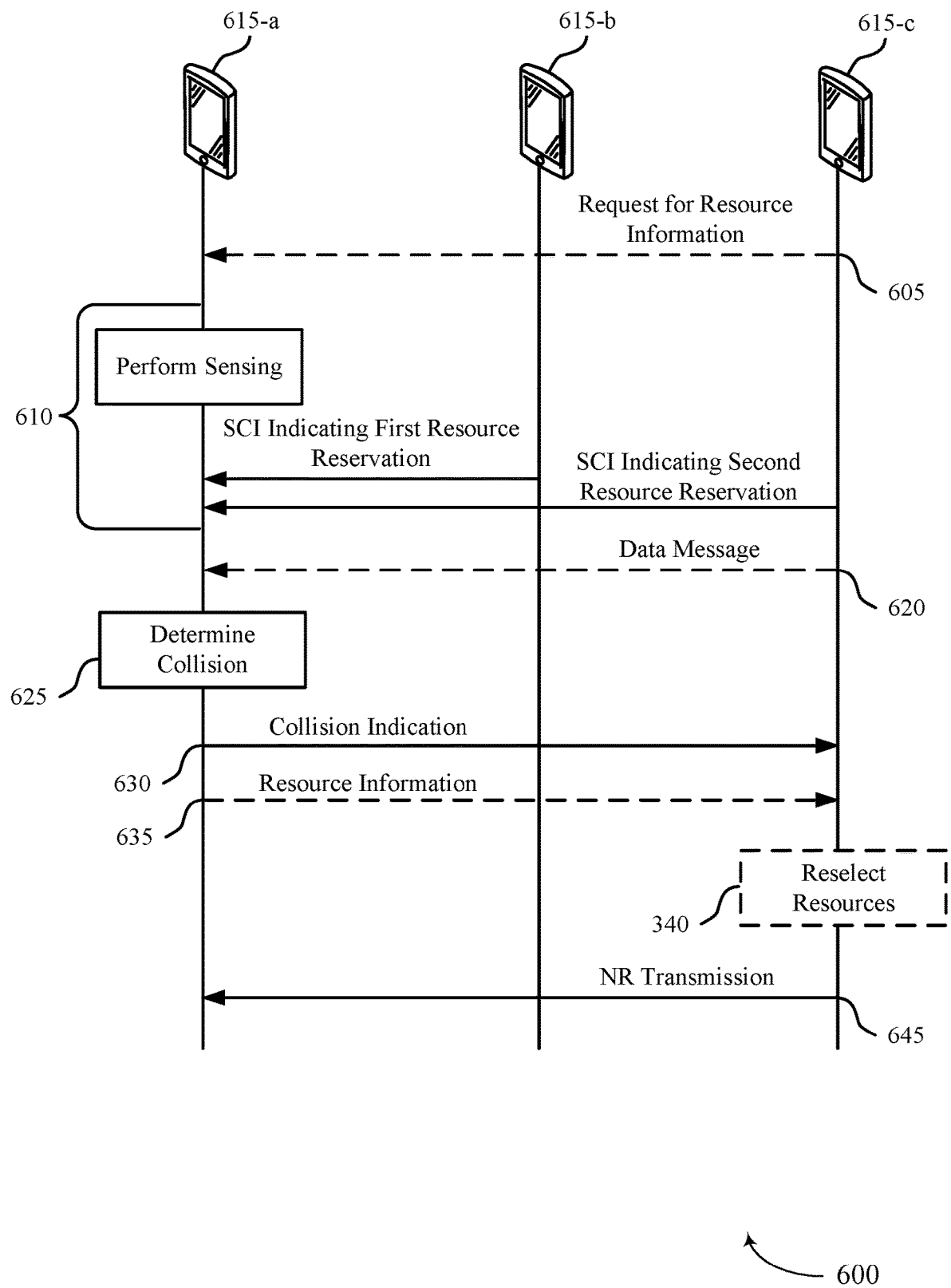

FIG. 6 illustrates an example of a process flow 600 that supports techniques for inter-UE coordination-based sidelink communications in accordance with various aspects of the present disclosure. The process flow 600 may include a UE 615-*a*, a UE 615-*b*, and a UE 615-*c*, which may be examples of UEs 115 as described herein. In the following description of the process flow 600, communications between the UE 615-*a*, the UE 615-*b*, and the UE 615-*c* may be transmitted in a different order than the example order shown, or the operations performed by the UE 615-*a*, the UE 615-*b*, and the UE 615-*c* may be performed in different orders or at different times. Some operations may also be omitted from the process flow 600, and other operations may be added to the process flow 600.

The process flow 600 may be an example of an inter-UE coordination procedure, such as a scheme 2-based conflict indication procedure. In the process flow 600, the UE 615-*a* may be an example of a Type A UE (e.g., a UE that supports wireless communications via multiple RATs that includes an LTE sidelink module and an NR sidelink module and supports LTE and NR communications. The UE 615-*b* may be an example of a Type C UE (e.g., a UE that supports wireless communications via one RAT) that includes an LTE sidelink module and communicates according to LTE procedures (e.g., and is not capable of NR communications). The UE 615-*c* may be an example of a Type B UE (e.g., a UE that supports wireless communications via one RAT) that includes an NR module and is capable of communicating according to NR procedures. The UE 615-*a* may be capable of sensing procedures performed to obtain sensing information associated with a resource pool shared amongst the UE 615-*a*, the UE 615-*b*, and the UE 615-*c*. The resource pool may be used for both LTE and NR communications. Additionally, although the process flow 600 describes an example of sidelink communications amongst the UE 615-*a*, the UE 615-*b*, and the UE 615-*c*, it is to be understood that other types of communications and devices may perform the operations described herein.

At 605, the UE 615-*c* may optionally transmit, and the UE 615-*a* may receive, a message indicating a request for resource information. The request for resource information may include or be an example of a request for coordination information such as an IUC message.

At 610, the UE 615-*a* may perform sensing to obtain sensing and resource reservation information for the resource pool. The resource pool may be associated with one or more channels (e.g., sidelink channels). The UE 615-*a* may perform the sensing to determine a set of resources of the resource pool that are reserved by other UEs (e.g., including the UE 615-*b* and the UE 615-*c*). For example, the UE 615-*a* may perform sensing of one or more sidelink messages transmitted by one or more other UEs, each sidelink message indicating a respective subset of resources of the set of resources of the resource pool that are reserved by the transmitting UE for sidelink communications via a channel (e.g., a sidelink channel). The UE 615-*a* may determine that respective resources of the set of resources (e.g., respective subsets of resources of the set of resources) are associated with LTE or NR.

In some examples, sensing may include the UE 615-*a* receiving, from the UE 615-*b*, a sidelink message (e.g., SCI) indicating a first resource reservation for a first one or more resources of the resource pool. The first one or more resources may be associated with LTE (e.g., based on the UE 615-*b* being a Type C UE). That is, the first one or more resources may be reserved by the UE 615-*b* for an LTE transmission by the UE 615-*b* via the channel. In some cases, the UE 615-*b* may indicate a priority of the LTE transmission as part of the sidelink message.

Additionally, sensing may include the UE 615-*a* receiving, from the UE 615-*c*, a sidelink message (e.g., SCI) indicating a second resource reservation for a second one or more resources of the resource pool. The second one or more resources may be associated with NR (e.g., based on the UE 615-*c* being a Type B UE) and may be reserved by the UE 615-*c* for an NR transmission by the UE 615-*c* via the channel. In some cases, the UE 615-*c* may indicate a priority of the NR transmission as part of the sidelink message.

The UE 615-*a* may determine resource information associated with the resource pool based on a result of the sensing (e.g., based on determining the set of resources reserved by at least the UE 615-*b* and the UE 615-*c*). The resource information may be for the UE 615-*c*, e.g., for NR transmissions by the UE 615-*c*. The resource information may include resource reservation information, resource partition information, or a combination thereof. In some examples, the resource reservation information may include one or more preferred resources of the set of resources, one or more non-preferred resources of the set of resources, or a combination thereof, for the UE 615-*c* (e.g., for the NR transmissions by the UE 615-*c*). In some examples, the one or more non-preferred resources may correspond to (e.g., include) the first one or more resources associated with LTE and reserved by the UE 615-*b*, while the one or more preferred resources may include the second one or more resources associated with NR and reserved by the UE 615-*c*. Additionally, or alternatively, the UE 615-*a* may exclude the one or more non-preferred resources to determine the one or more preferred resources. In some cases, the resource partition information may include a transmission resource set, a fraction (e.g., a ratio, a percentage) of resources of the set of resources that are available for NR, a fraction (e.g., a ratio, a percentage) of resources of the set of resources that are available for LTE, or a combination thereof.

At 620, the UE 615-*c* may transmit, and the UE 615-*a* may receive, a data message (e.g., an NR message) via one or more resources that overlap (e.g., partially or fully) with one or more resources associated with LTE.

At 625, the UE 615-*a* may determine or otherwise identify a collision. For example, the UE 615-*a* may determine that the data message transmitted by the UE 615-*c* at 615 has collided (e.g., conflicted) with the one or more resources associated with LTE. Additionally, or alternatively, the UE 615-*a* may determine that the second one or more resources reserved by the UE 615-*c* at 610 overlap (e.g., partially or fully) with one or more resources associated with LTE.

At 630, the UE 615-*a* may transmit, and the UE 615-*c* may receive, a collision indication (e.g., as part of an IUC message). In some examples, the collision indication may be a post-collision indication that indicates a collision between the data message transmitted by the UE 615-*c* at 615 and the one or more resources associated with LTE. In other examples, the collision indication may be a pre-collision indication that indicates a collision between the one or more resources associated with LTE and the second one or more resources reserved by the UE 615-*c* (e.g., at 610) for the NR transmission. In some cases, the UE 615-*a* may transmit, and the UE 615-*c* may receive, the collision indication over a time domain resource, a frequency domain resource, or a code domain resource that is associated with collision indications for NR and LTE.

In some examples, the UE 615-*a* may transmit the collision indication based on a priority associated with the data message, a priority associated with the NR transmission for which the second one or more resources are reserved, a priority of the one or more resources associated with LTE, an RSRP associated with the SCI received from the UE 615-*c*, or a combination thereof. For instance, if the RSRP associated with the SCI satisfies (e.g., is greater than) a threshold, the UE 615-*a* may transmit the collision indication.

At 635, the UE 615-*a* may optionally transmit resource information for the resource pool to the UE 615-*c*. For instance, the UE 615-*a* may be triggered to transmit an IUC message indicating resource reservation information, resource partition information, or the like to the UE 615-*c* based on determining the collision at 620.

At 640, the UE 615-*c* may optionally reselect resources for the NR transmission based on the collision indication. That is, the UE 615-*c* may modify or adjust the one or more resources reserved by the SCI transmitted at 610. For instance, the UE 615-*c* may exclude one or more resources from a set of available resources for the NR transmission based on the collision indication.

At 645, the UE 615-*c* may transmit the NR transmission based on receiving the collision indication and, in some cases, based on reselecting resources at 635.

Figure 7:
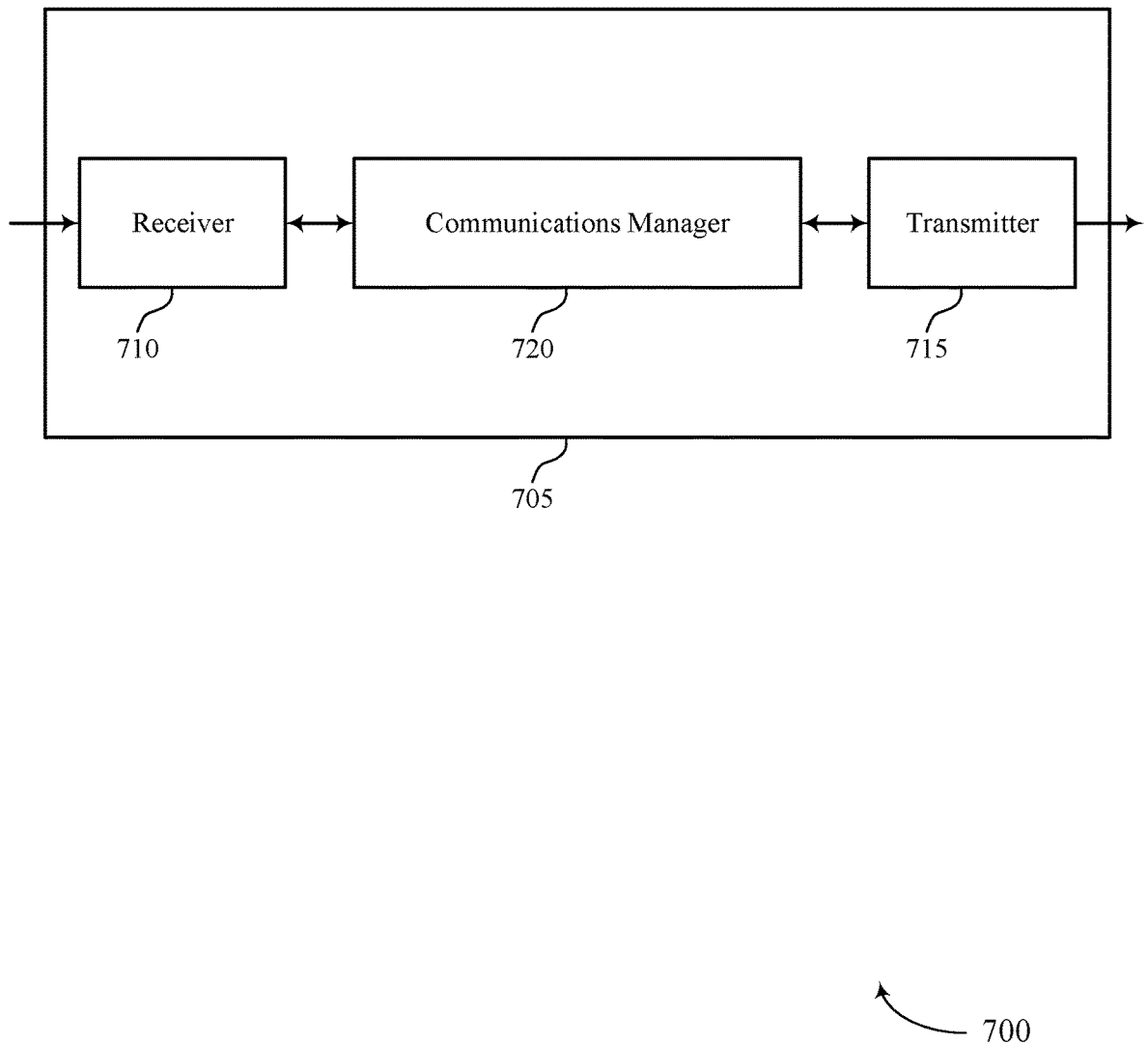
FIGS. 7 and 8 show block diagrams of devices that support techniques for inter-UE coordination-based sidelink communications in accordance with one or more aspects of the present disclosure.

FIG. 7 shows a block diagram 700 of a device 705 that supports techniques for inter-UE coordination-based sidelink communications in accordance with various aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for inter-UE coordination-based sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for inter-UE coordination-based sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for inter-UE coordination-based sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. For example, the communications manager 720 may be configured as or otherwise support a means for sensing one or more sidelink messages that indicate a set of resources of a resource pool that are reserved by one or more other UEs for sidelink communications, respective resources of the set of resources being associated with a first RAT or a second RAT different from the first RAT. The communications manager 720 may be configured as or otherwise support a means for transmitting, to a second UE, a message indicating resource information for transmissions by the second UE, where the resource information indicates that a first subset of resources of the set of resources is associated with the first RAT and a second subset of resources of the set of resources is associated with the second RAT.

Additionally, or alternatively, the communications manager 720 may support wireless communications at a second UE in accordance with examples as disclosed herein. For example, the communications manager 720 may be configured as or otherwise support a means for receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications. The communications manager 720 may be configured as or otherwise support a means for selecting one or more resources from the resource pool for a data message based on the resource information. The communications manager 720 may be configured as or otherwise support a means for transmitting the data message in accordance with the first RAT using the selected one or more resources.

Additionally, or alternatively, the communications manager 720 may support wireless communications at a first UE in accordance with examples as disclosed herein. For example, the communications manager 720 may be configured as or otherwise support a means for sensing one or more sidelink messages that indicate a set of resources of a resource pool that are reserved by one or more other UEs, respective resources of the set of resources being associated with a first RAT or a second RAT different from the first RAT. The communications manager 720 may be configured as or otherwise support a means for receiving, from a second UE, a first message indicating a resource reservation for a data message to be transmitted by the second UE, the data message associated with the first RAT. The communications manager 720 may be configured as or otherwise support a means for transmitting, to the second UE, a second message indicating a collision between the data message and one or more resources of the set of resources associated with the second RAT, where the collision is based on the data message and the one or more resources at least partially overlapping.

Additionally, or alternatively, the communications manager 720 may support wireless communications at a second UE in accordance with examples as disclosed herein. For example, the communications manager 720 may be configured as or otherwise support a means for transmitting, to a first UE, a first message indicating a resource reservation for a sidelink message associated with a first RAT. The communications manager 720 may be configured as or otherwise support a means for receiving, from the first UE, a second message indicating a collision between the sidelink message and one or more resources associated with a second RAT, where the collision is based on the sidelink message and the one or more resources at least partially overlapping. The communications manager 720 may be configured as or otherwise support a means for transmitting the sidelink message in accordance with the first RAT based on receiving the second message.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for efficient utilization of communication resources. For example, by using the shared sidelink resource pool techniques described herein, various devices may communicate over sidelinks using different RATs while reducing or limiting interference, which supports improved resource utilization.

Figure 8:
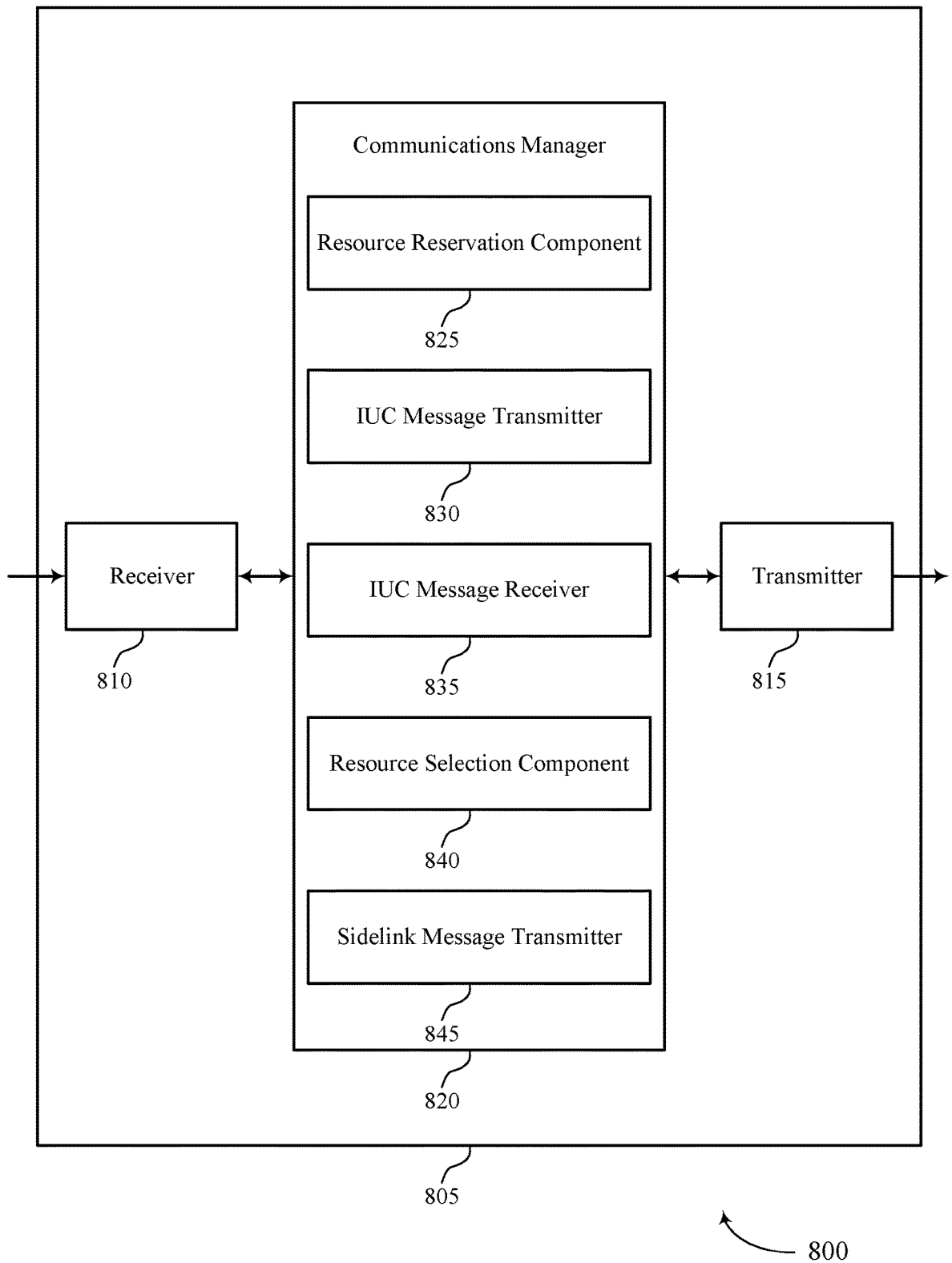

FIG. 8 shows a block diagram 800 of a device 805 that supports techniques for inter-UE coordination-based sidelink communications in accordance with various aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for inter-UE coordination-based sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for inter-UE coordination-based sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for inter-UE coordination-based sidelink communications as described herein. For example, the communications manager 820 may include a resource reservation component 825, an IUC message transmitter 830, an IUC message receiver 835, a resource selection component 840, a sidelink message transmitter 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first UE in accordance with examples as disclosed herein. The resource reservation component 825 may be configured as or otherwise support a means for sensing one or more sidelink messages that indicate a set of resources of a resource pool that are reserved by one or more other UEs for sidelink communications, respective resources of the set of resources being associated with a first RAT or a second RAT different from the first RAT. The IUC message transmitter 830 may be configured as or otherwise support a means for transmitting, to a second UE, a message indicating resource information for transmissions by the second UE, where the resource information indicates that a first subset of resources of the set of resources is associated with the first RAT and a second subset of resources of the set of resources is associated with the second RAT.

Additionally, or alternatively, the communications manager 820 may support wireless communications at a second UE in accordance with examples as disclosed herein. The IUC message receiver 835 may be configured as or otherwise support a means for receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications. The resource selection component 840 may be configured as or otherwise support a means for selecting one or more resources from the resource pool for a data message based on the resource information. The sidelink message transmitter 845 may be configured as or otherwise support a means for transmitting the data message in accordance with the first RAT using the selected one or more resources.

Additionally, or alternatively, the communications manager 820 may support wireless communications at a first UE in accordance with examples as disclosed herein. The resource reservation component 825 may be configured as or otherwise support a means for sensing one or more sidelink messages that indicate a set of resources of a resource pool that are reserved by one or more other UEs, respective resources of the set of resources being associated with a first RAT or a second RAT different from the first RAT. The resource reservation component 825 may be configured as or otherwise support a means for receiving, from a second UE, a first message indicating a resource reservation for a data message to be transmitted by the second UE, the data message associated with the first RAT. The IUC message transmitter 830 may be configured as or otherwise support a means for transmitting, to the second UE, a second message indicating a collision between the data message and one or more resources of the set of resources associated with the second RAT, where the collision is based on the data message and the one or more resources at least partially overlapping.

Additionally, or alternatively, the communications manager 820 may support wireless communications at a second UE in accordance with examples as disclosed herein. The resource selection component 840 may be configured as or otherwise support a means for transmitting, to a first UE, a first message indicating a resource reservation for a sidelink message associated with a first RAT. The IUC message receiver 835 may be configured as or otherwise support a means for receiving, from the first UE, a second message indicating a collision between the sidelink message and one or more resources associated with a second RAT, where the collision is based on the sidelink message and the one or more resources at least partially overlapping. The sidelink message transmitter 845 may be configured as or otherwise support a means for transmitting the sidelink message in accordance with the first RAT based on receiving the second message.

Figure 9:
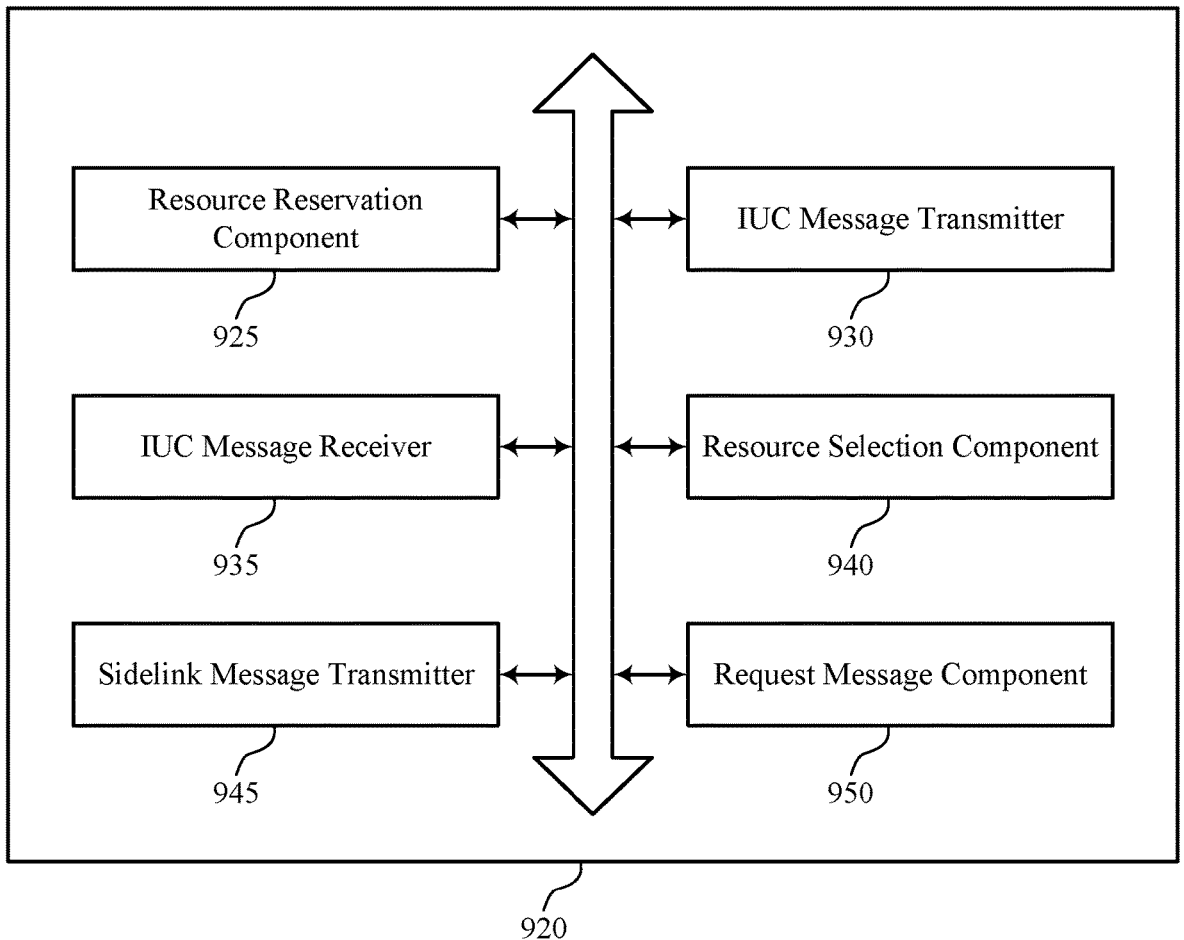
FIG. 9 shows a block diagram of a communications manager that supports techniques for inter-UE coordination-based sidelink communications in accordance with one or more aspects of the present disclosure.

FIG. 9 shows a block diagram 900 of a communications manager 920 that supports techniques for inter-UE coordination-based sidelink communications in accordance with various of the present disclosure. The communications manager 920 may be an example of aspects of a communications manager 720, a communications manager 820, or both, as described herein. The communications manager 920, or various components thereof, may be an example of means for performing various aspects of techniques for inter-UE coordination-based sidelink communications as described herein. For example, the communications manager 920 may include a resource reservation component 925, an IUC message transmitter 930, an IUC message receiver 935, a resource selection component 940, a sidelink message transmitter 945, a request message component 950, or any combination thereof. Each of these components may communicate, directly or indirectly, with one another (e.g., via one or more buses).

The communications manager 920 may support wireless communications at a first UE in accordance with examples as disclosed herein. The resource reservation component 925 may be configured as or otherwise support a means for sensing one or more sidelink messages that indicate a set of resources of a resource pool that are reserved by one or more other UEs for sidelink communications, respective resources of the set of resources being associated with a first RAT or a second RAT different from the first RAT. The IUC message transmitter 930 may be configured as or otherwise support a means for transmitting, to a second UE, a message indicating resource information for transmissions by the second UE, where the resource information indicates that a first subset of resources of the set of resources is associated with the first RAT and a second subset of resources of the set of resources is associated with the second RAT.

In some examples, to support transmitting the message indicating the resource information, the IUC message transmitter 930 may be configured as or otherwise support a means for transmitting the resource information indicating that the second subset of resources is to be excluded from available resources for the transmissions by the second UE based on the second subset of resources being associated with the second RAT.

In some examples, to support transmitting the message indicating the resource information, the IUC message transmitter 930 may be configured as or otherwise support a means for transmitting the resource information indicating that the first subset of resources is to be included in available resources for the transmissions by the second UE based on the first subset of resources being associated with the first RAT.

In some examples, to support transmitting the message indicating the resource information, the IUC message transmitter 930 may be configured as or otherwise support a means for transmitting an indication of a resource partition (e.g., a transmission resource set) for the resource pool, the resource partition separating the resource pool into the first subset of resources and the second subset of resources.

In some examples, the indication of the resource partition includes an index corresponding to a percentage of resources of the resource pool that are allocated for transmissions associated with the first RAT, an index corresponding to a percentage of resources of the resource pool that are allocated for transmissions associated with the second RAT, or both.

In some examples, the indication of the resource partition includes a bitmap indicating resources of the resource pool that are available for the transmissions by the second UE, resources of the resource pool that are unavailable for the transmissions by the second UE, or both.

In some examples, to support transmitting the message indicating the resource information, the IUC message transmitter 930 may be configured as or otherwise support a means for transmitting, as part of the message, an indication of a periodicity for applying the resource information, a periodicity with which the set of resources are reserved by the other UEs, a zone identifier associated with the first UE, a group identifier associated with the first UE, a priority associated with the second subset of resources, or a combination thereof.

In some examples, the request message component 950 may be configured as or otherwise support a means for receiving, from the second UE, a request for the resource information, where transmitting the message is based on the request.

In some examples, to support transmitting the message indicating the resource information, the IUC message transmitter 930 may be configured as or otherwise support a means for transmitting sidelink control information, a MAC-CE, or a signal multiplexed with data associated with the first RAT.

Additionally, or alternatively, the communications manager 920 may support wireless communications at a second UE in accordance with examples as disclosed herein. The IUC message receiver 935 may be configured as or otherwise support a means for receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications. The resource selection component 940 may be configured as or otherwise support a means for selecting one or more resources from the resource pool for a data message based on the resource information. The sidelink message transmitter 945 may be configured as or otherwise support a means for transmitting the data message in accordance with the first RAT using the selected one or more resources.

In some examples, to support selecting the one or more resources, the resource selection component 940 may be configured as or otherwise support a means for excluding at least one resource from the resource pool based on the resource information indicating that the second subset of resources is to be excluded, where the second subset of resources is to be excluded based on the second subset of resources being associated with the second RAT, and where the second subset of resources includes the at least one resource.

In some examples, to support selecting the one or more resources, the resource selection component 940 may be configured as or otherwise support a means for including at least one resource in the resource pool based on the resource information indicating that the first subset of resources is to be included, where the first subset of resources is to be included based on the first subset of resources being associated with the first RAT, and where the first subset of resources includes the at least one resource.

In some examples, to support receiving the message indicating the resource information, the IUC message receiver 935 may be configured as or otherwise support a means for receiving an indication of a resource partition for the resource pool, the resource partition separating the resource pool into the first subset of resources and the second subset of resources.

In some examples, the indication of the resource partition includes an index, and the resource selection component 940 may be configured as or otherwise support a means for mapping the index to a percentage of resources of the resource pool that are allocated for transmissions associated with the first RAT, a percentage of resources of the resource pool that are allocated for transmissions associated with the second RAT, or both.

In some examples, to support selecting the one or more resources, the resource selection component 940 may be configured as or otherwise support a means for excluding at least one resource from the resource pool based on the bitmap.

In some examples, to support selecting the one or more resources, the resource selection component 940 may be configured as or otherwise support a means for excluding at least one resource of the second subset of resources from the resource pool based on a priority associated with the second subset of resources, a priority associated with the message, a reference signal received power associated with the message, or a combination thereof.

In some examples, to support selecting the one or more resources, the resource selection component 940 may be configured as or otherwise support a means for selecting the one or more resources based on the message further indicating a periodicity for applying the resource information, a periodicity with which the set of resources are reserved by the other UEs, a zone identifier associated with the first UE, a group identifier associated with the first UE, a priority associated with the second subset of resources, or a combination thereof.

In some examples, to support receiving the message indicating the resource information, the IUC message receiver 935 may be configured as or otherwise support a means for receiving sidelink control information, a MAC-CE, or a signal multiplexed with data associated with the first RAT.

In some examples, the request message component 950 may be configured as or otherwise support a means for transmitting, to the first UE, a request for the resource information, where receiving the message is based on the request.

In some examples, to support selecting the one or more resources, the resource selection component 940 may be configured as or otherwise support a means for applying the resource information for the first message based on receiving the message within the first time interval.

In some examples, the IUC message receiver 935 may be configured as or otherwise support a means for receiving a second message indicating second resource information for the transmissions by the second UE, where the second message is received during a second time interval that is subsequent to the first time interval. In some examples, the IUC message receiver 935 may be configured as or otherwise support a means for discarding the second message based on receiving the second message during the second time interval.

Additionally, or alternatively, the communications manager 920 may support wireless communications at a first UE in accordance with examples as disclosed herein. In some examples, the resource reservation component 925 may be configured as or otherwise support a means for sensing one or more sidelink messages that indicate a set of resources of a resource pool that are reserved by one or more other UEs, respective resources of the set of resources being associated with a first RAT or a second RAT different from the first RAT. In some examples, the resource reservation component 925 may be configured as or otherwise support a means for receiving, from a second UE, a first message indicating a resource reservation for a data message to be transmitted by the second UE, the data message associated with the first RAT. In some examples, the IUC message transmitter 930 may be configured as or otherwise support a means for transmitting, to the second UE, a second message indicating a collision between the data message and one or more resources of the set of resources associated with the second RAT, where the collision is based on the data message and the one or more resources at least partially overlapping.

In some examples, the IUC message transmitter 930 may be configured as or otherwise support a means for transmitting, to the second UE, a third message indicating resource information for transmissions by the second UE based on transmitting the second message, where the resource information indicates that a first subset of resources of the set of resources is associated with the first RAT and a second subset of resources of the set of resources is associated with the second RAT.

In some examples, to support transmitting the second message, the IUC message transmitter 930 may be configured as or otherwise support a means for transmitting the second message over a time domain resource, a frequency domain resource, or a code domain resource that is associated with collision indications for the first RAT and the second RAT.

In some examples, the request message component 950 may be configured as or otherwise support a means for receiving, from the second UE, a third message indicating a request for resource information, where the second message is transmitted based on the request.

In some examples, transmitting the second message is based on a priority associated with the data message, a priority associated with the set of resources, a reference signal received power associated with the first message, or a combination thereof.

Additionally, or alternatively, the communications manager 920 may support wireless communications at a second UE in accordance with examples as disclosed herein. In some examples, the resource selection component 940 may be configured as or otherwise support a means for transmitting, to a first UE, a first message indicating a resource reservation for a sidelink message associated with a first RAT. In some examples, the IUC message receiver 935 may be configured as or otherwise support a means for receiving, from the first UE, a second message indicating a collision between the sidelink message and one or more resources associated with a second RAT, where the collision is based on the sidelink message and the one or more resources at least partially overlapping. In some examples, the sidelink message transmitter 945 may be configured as or otherwise support a means for transmitting the sidelink message in accordance with the first RAT based on receiving the second message.

In some examples, the resource selection component 940 may be configured as or otherwise support a means for excluding the one or more resources from a set of available resources for the sidelink message based on the second message, where transmitting the sidelink message is based on the excluded one or more resources.

In some examples, the IUC message receiver 935 may be configured as or otherwise support a means for receiving, from the first UE, a third message indicating resource information for transmissions by the second UE based on the received second message, where the resource information indicates that a first subset of resources of a set of resources of a resource pool is associated with the first RAT and a second subset of resources of the set of resources is associated with the second RAT.

In some examples, to support receiving the second message, the IUC message receiver 935 may be configured as or otherwise support a means for receiving the second message over a time domain resource, a frequency domain resource, or a code domain resource that is associated with collision indications for the first RAT and the second RAT.

In some examples, the request message component 950 may be configured as or otherwise support a means for transmitting, to the first UE, a third message indicating a request for resource information, where the second message is received based on the request.

Figure 10:
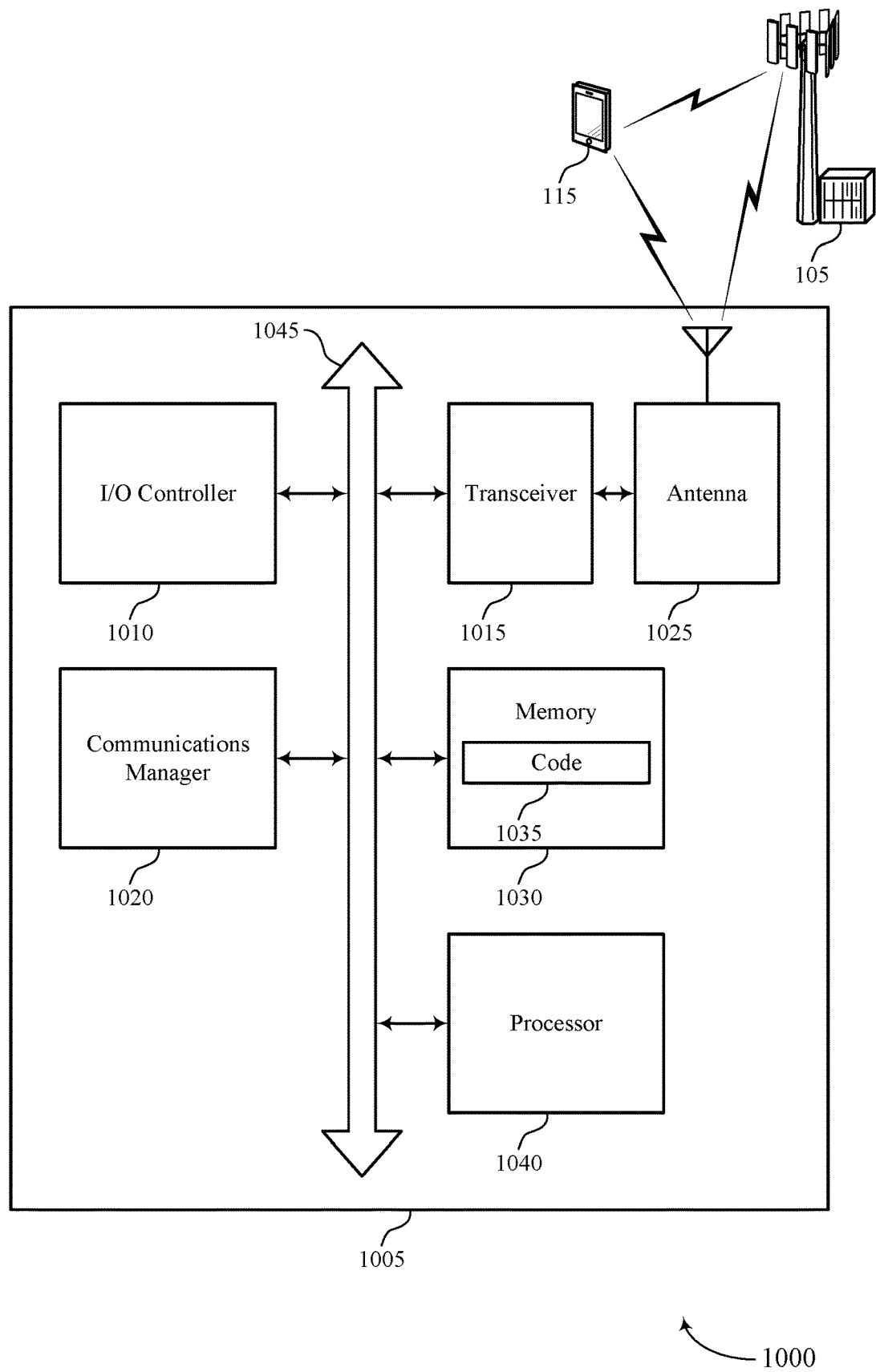
FIG. 10 shows a diagram of a system including a device that supports techniques for inter-UE coordination-based sidelink communications in accordance with one or more aspects of the present disclosure.

FIG. 10 shows a diagram of a system 1000 including a device 1005 that supports techniques for inter-UE coordination-based sidelink communications in accordance with various aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for inter-UE coordination-based sidelink communications). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for sensing one or more sidelink messages that indicate a set of resources of a resource pool that are reserved by one or more other UEs for sidelink communications, respective resources of the set of resources being associated with a first RAT or a second RAT different from the first RAT. The communications manager 1020 may be configured as or otherwise support a means for transmitting, to a second UE, a message indicating resource information for transmissions by the second UE, where the resource information indicates that a first subset of resources of the set of resources is associated with the first RAT and a second subset of resources of the set of resources is associated with the second RAT.

Additionally, or alternatively, the communications manager 1020 may support wireless communications at a second UE in accordance with examples as disclosed herein. For example, the communications manager 1020 may be configured as or otherwise support a means for receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications. The communications manager 1020 may be configured as or otherwise support a means for selecting one or more resources from the resource pool for a data message based on the resource information. The communications manager 1020 may be configured as or otherwise support a means for transmitting the data message in accordance with the first RAT using the selected one or more resources.

Additionally, or alternatively, the communications manager 1020 may support wireless communications at a first UE in accordance with examples as disclosed herein. For example, the communications manager 1020 may be configured as or otherwise support a means for sensing one or more sidelink messages that indicate a set of resources of a resource pool that are reserved by one or more other UEs, respective resources of the set of resources being associated with a first RAT or a second RAT different from the first RAT. The communications manager 1020 may be configured as or otherwise support a means for receiving, from a second UE, a first message indicating a resource reservation for a data message to be transmitted by the second UE, the data message associated with the first RAT. The communications manager 1020 may be configured as or otherwise support a means for transmitting, to the second UE, a second message indicating a collision between the data message and one or more resources of the set of resources associated with the second RAT, where the collision is based on the data message and the one or more resources at least partially overlapping.

Additionally, or alternatively, the communications manager 1020 may support wireless communications at a second UE in accordance with examples as disclosed herein. For example, the communications manager 1020 may be configured as or otherwise support a means for transmitting, to a first UE, a first message indicating a resource reservation for a sidelink message associated with a first RAT. The communications manager 1020 may be configured as or otherwise support a means for receiving, from the first UE, a second message indicating a collision between the sidelink message and one or more resources associated with a second RAT, where the collision is based on the sidelink message and the one or more resources at least partially overlapping. The communications manager 1020 may be configured as or otherwise support a means for transmitting the sidelink message in accordance with the first RAT based on receiving the second message.

By including or configuring the communications manager 1020 in accordance with examples as described herein, the device 1005 may support techniques for more efficient utilization of communication resources. For example, by using the techniques described herein to utilize resources of a shared resource pool, various devices may communicate using resources of the shared resource pool in manner that limits or reduces interference across RATs.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for inter-UE coordination-based sidelink communications as described herein, or the processor 1040 and the memory 1030 may be otherwise configured to perform or support such operations.

Figure 11:
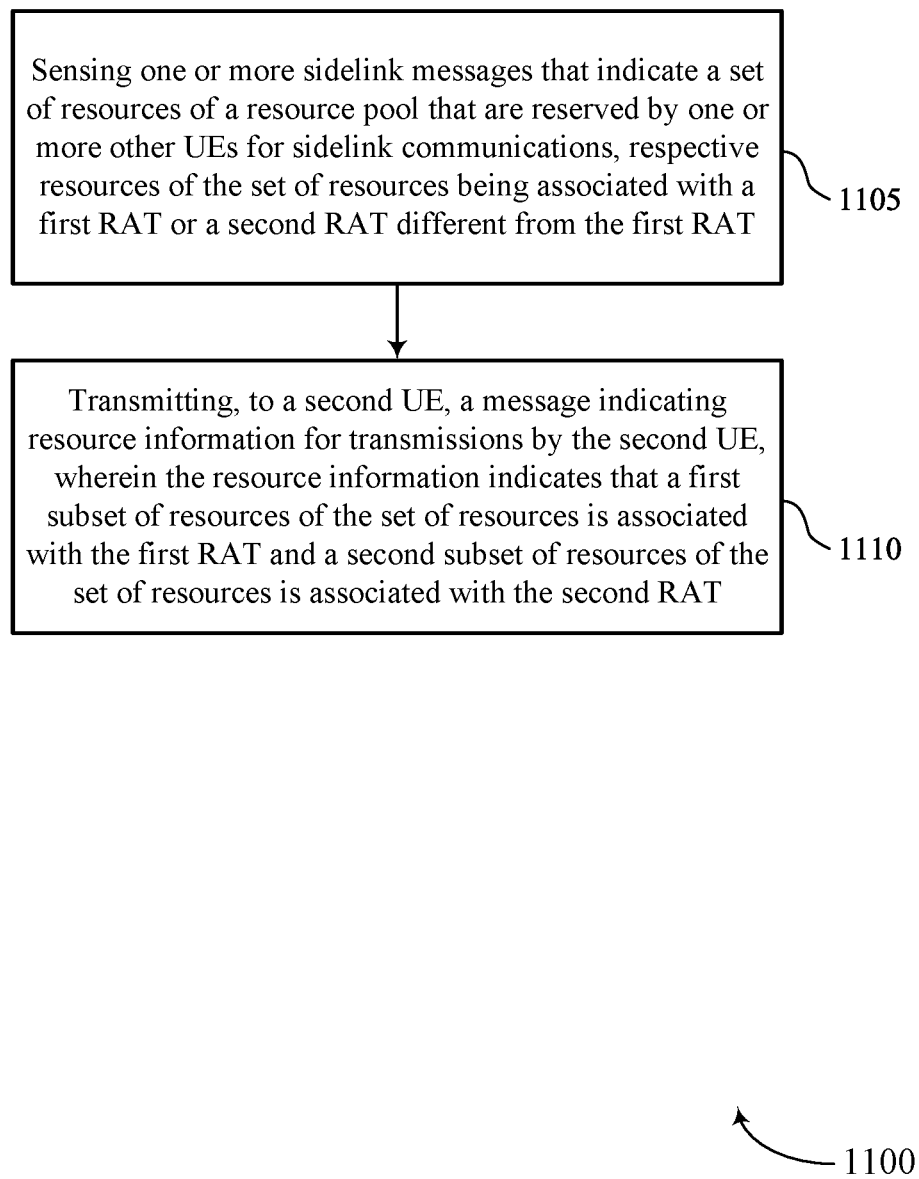
FIGS. 11 through 16 show flowcharts illustrating methods that support techniques for inter-UE coordination-based sidelink communications in accordance with one or more aspects of the present disclosure.

FIG. 11 shows a flowchart illustrating a method 1100 that supports techniques for inter-UE coordination-based sidelink communications in accordance with various aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the functions described herein. Additionally, or alternatively, the UE may perform aspects of the functions described herein using special-purpose hardware.

At 1105, the method may include sensing one or more sidelink messages that indicate a set of resources of a resource pool that are reserved by one or more other UEs for sidelink communications, respective resources of the set of resources being associated with a first RAT or a second RAT different from the first RAT. The operations of 1105 may be performed in accordance with examples as disclosed herein. In some examples, aspects of the operations of 1105 may be performed by a resource reservation component 925 as described with reference to FIG. 9.

At 1110, the method may include transmitting, to a second UE, a message indicating resource information for transmissions by the second UE, where the resource information indicates that a first subset of resources of the set of resources is associated with the first RAT and a second subset of resources of the set of resources is associated with the second RAT. The operations of 1110 may be performed in accordance with examples as disclosed herein. In some examples, aspects of the operations of 1110 may be performed by an IUC message transmitter 930 as described with reference to FIG. 9.

Figure 12:
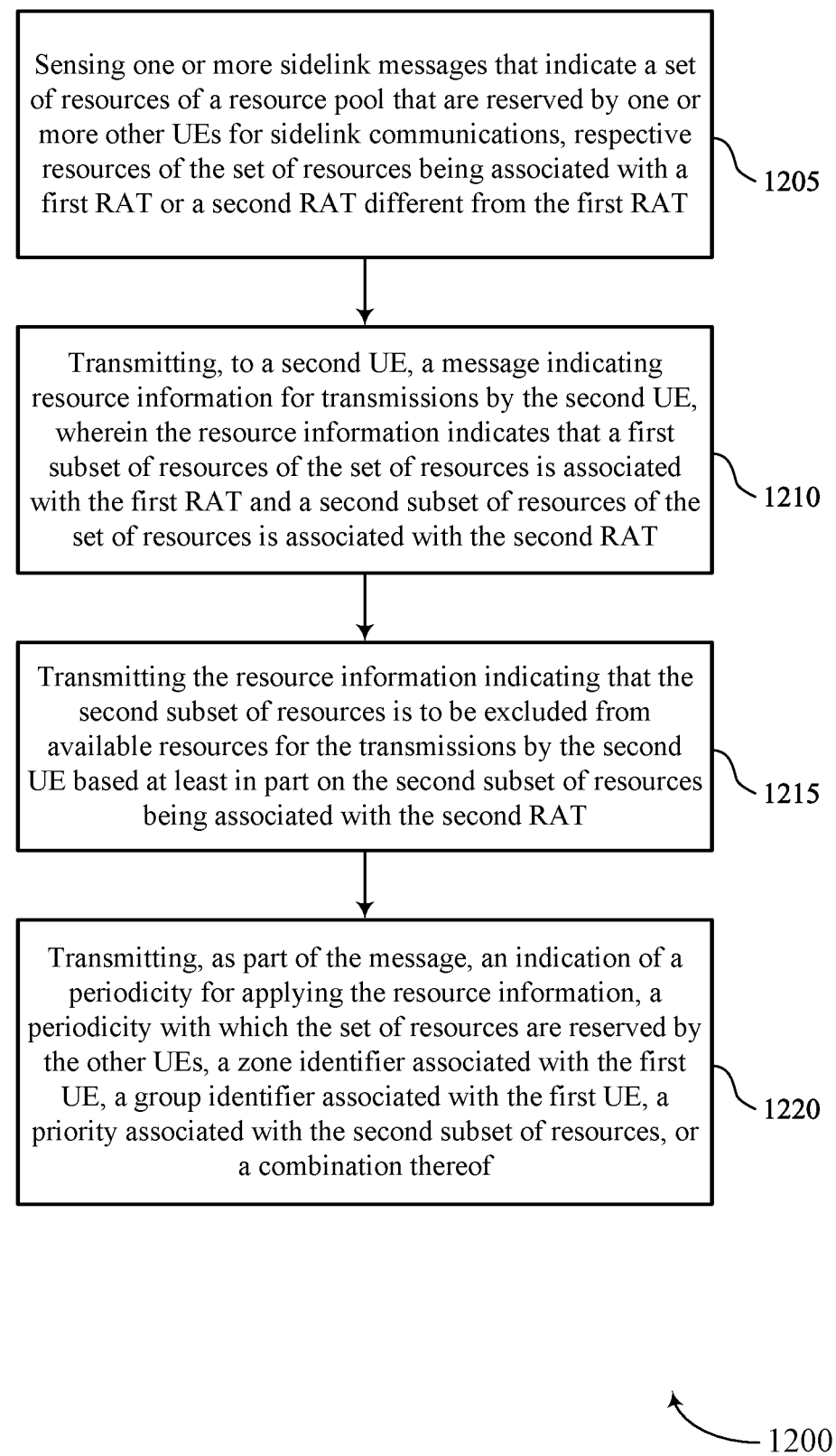

FIG. 12 shows a flowchart illustrating a method 1200 that supports techniques for inter-UE coordination-based sidelink communications in accordance with various aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the functions described herein. Additionally, or alternatively, the UE may perform aspects of the functions described herein using special-purpose hardware.

At 1205, the method may include sensing one or more sidelink messages that indicate a set of resources of a resource pool that are reserved by one or more other UEs for sidelink communications, respective resources of the set of resources being associated with a first RAT or a second RAT different from the first RAT. The operations of 1205 may be performed in accordance with examples as disclosed herein. In some examples, aspects of the operations of 1205 may be performed by a resource reservation component 925 as described with reference to FIG. 9.

At 1210, the method may include transmitting, to a second UE, a message indicating resource information for transmissions by the second UE, where the resource information indicates that a first subset of resources of the set of resources is associated with the first RAT and a second subset of resources of the set of resources is associated with the second RAT. The operations of 1210 may be performed in accordance with examples as disclosed herein. In some examples, aspects of the operations of 1210 may be performed by an IUC message transmitter 930 as described with reference to FIG. 9.

At 1215, the method may include transmitting the resource information indicating that the second subset of resources is to be excluded from available resources for the transmissions by the second UE based on the second subset of resources being associated with the second RAT. The operations of 1215 may be performed in accordance with examples as disclosed herein. In some examples, aspects of the operations of 1215 may be performed by an IUC message transmitter 930 as described with reference to FIG. 9.

At 1220, the method may include transmitting, as part of the message, an indication of a periodicity for applying the resource information, a periodicity with which the set of resources are reserved by the other UEs, a zone ID associated with the first UE, a group ID associated with the first UE, a priority associated with the second subset of resources, or a combination thereof. The operations of 1220 may be performed in accordance with examples as disclosed herein. In some examples, aspects of the operations of 1220 may be performed by an IUC message transmitter 930 as described with reference to FIG. 9.

Figure 13:
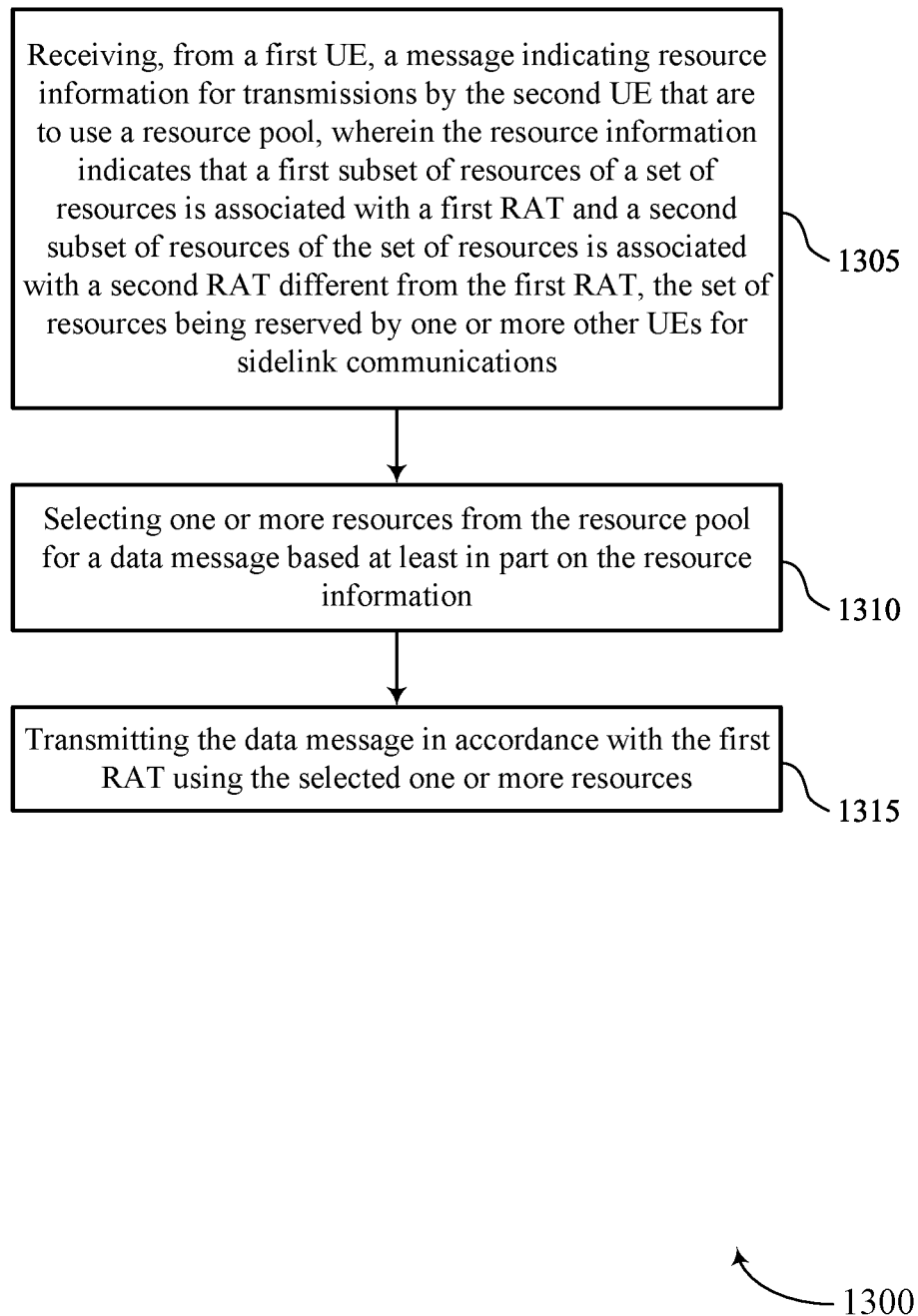

FIG. 13 shows a flowchart illustrating a method 1300 that supports techniques for inter-UE coordination-based sidelink communications in accordance with various aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the functions described herein. Additionally, or alternatively, the UE may perform aspects of the functions described herein using special-purpose hardware.

At 1305, the method may include receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications. The operations of 1305 may be performed in accordance with examples as disclosed herein. In some examples, aspects of the operations of 1305 may be performed by an IUC message receiver 935 as described with reference to FIG. 9.

At 1310, the method may include selecting one or more resources from the resource pool for a data message based on the resource information. The operations of 1310 may be performed in accordance with examples as disclosed herein. In some examples, aspects of the operations of 1310 may be performed by a resource selection component 940 as described with reference to FIG. 9.

At 1315, the method may include transmitting the data message in accordance with the first RAT using the selected one or more resources. The operations of 1315 may be performed in accordance with examples as disclosed herein. In some examples, aspects of the operations of 1315 may be performed by a sidelink message transmitter 945 as described with reference to FIG. 9.

Figure 14:
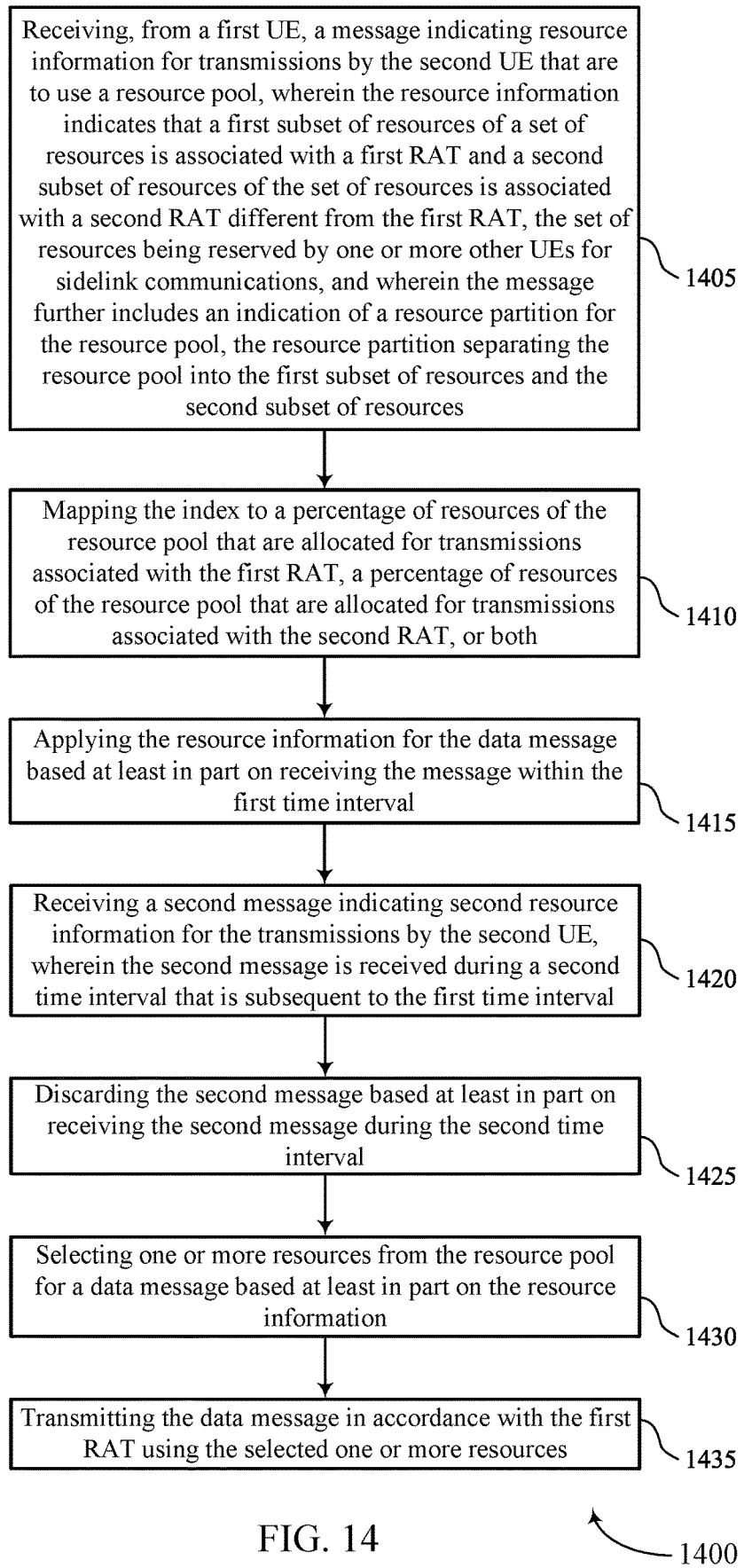

FIG. 14 shows a flowchart illustrating a method 1400 that supports techniques for inter-UE coordination-based sidelink communications in accordance with various aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the functions described herein. Additionally, or alternatively, the UE may perform aspects of the functions described herein using special-purpose hardware.

At 1405, the method may include receiving, from a first UE, a message indicating resource information for transmissions by the second UE that are to use a resource pool, where the resource information indicates that a first subset of resources of a set of resources is associated with a first RAT and a second subset of resources of the set of resources is associated with a second RAT different from the first RAT, the set of resources being reserved by one or more other UEs for sidelink communications. The message may further include an indication of a resource partition for the resource pool, the resource partition separating the resource pool into the first subset of resources and the second subset of resources. The operations of 1405 may be performed in accordance with examples as disclosed herein. In some examples, aspects of the operations of 1405 may be performed by an IUC message receiver 935 as described with reference to FIG. 9.

At 1410, the method may include mapping the index to a percentage of resources of the resource pool that are allocated for transmissions associated with the first RAT, a percentage of resources of the resource pool that are allocated for transmissions associated with the second RAT, or both. The operations of 1410 may be performed in accordance with examples as disclosed herein. In some examples, aspects of the operations of 1410 may be performed by a resource selection component 940 as described with reference to FIG. 9.

At 1415, the method may include applying the resource information for the first message based on receiving the message within the first time interval. The operations of 1415 may be performed in accordance with examples as disclosed herein. In some examples, aspects of the operations of 1415 may be performed by a resource selection component 940 as described with reference to FIG. 9.

At 1420, the method may include receiving a second message indicating second resource information for the transmissions by the second UE, where the second message is received during a second time interval that is subsequent to the first time interval. The operations of 1420 may be performed in accordance with examples as disclosed herein. In some examples, aspects of the operations of 1420 may be performed by an IUC message receiver 935 as described with reference to FIG. 9.

At 1425, the method may include discarding the second message based on receiving the second message during the second time interval. The operations of 1425 may be performed in accordance with examples as disclosed herein. In some examples, aspects of the operations of 1425 may be performed by an IUC message receiver 935 as described with reference to FIG. 9.

At 1430, the method may include selecting one or more resources from the resource pool for a data message based on the resource information. The operations of 1430 may be performed in accordance with examples as disclosed herein. In some examples, aspects of the operations of 1430 may be performed by a resource selection component 940 as described with reference to FIG. 9.

At 1435, the method may include transmitting the data message in accordance with the first RAT using the selected one or more resources. The operations of 1435 may be performed in accordance with examples as disclosed herein. In some examples, aspects of the operations of 1435 may be performed by a sidelink message transmitter 945 as described with reference to FIG. 9.

Figure 15:
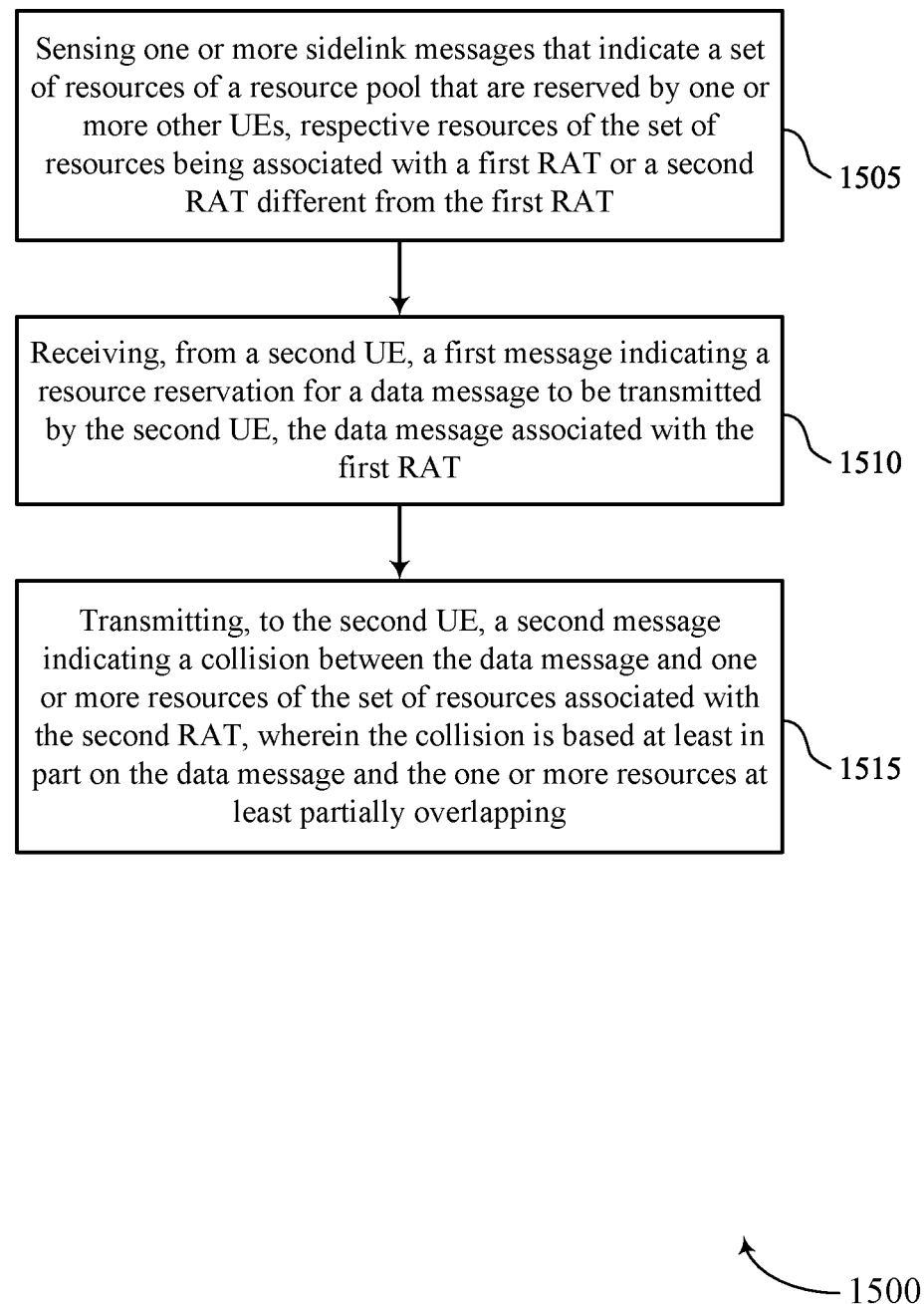

FIG. 15 shows a flowchart illustrating a method 1500 that supports techniques for inter-UE coordination-based sidelink communications in accordance with various aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the functions described herein. Additionally, or alternatively, the UE may perform aspects of the functions described herein using special-purpose hardware.

At 1505, the method may include sensing one or more sidelink messages that indicate a set of resources of a resource pool that are reserved by one or more other UEs, respective resources of the set of resources being associated with a first RAT or a second RAT different from the first RAT. The operations of 1505 may be performed in accordance with examples as disclosed herein. In some examples, aspects of the operations of 1505 may be performed by a resource reservation component 925 as described with reference to FIG. 9.

At 1510, the method may include receiving, from a second UE, a first message indicating a resource reservation for a data message to be transmitted by the second UE, the data message associated with the first RAT. The operations of 1510 may be performed in accordance with examples as disclosed herein. In some examples, aspects of the operations of 1510 may be performed by a resource reservation component 925 as described with reference to FIG. 9.

At 1515, the method may include transmitting, to the second UE, a second message indicating a collision between the data message and one or more resources of the set of resources associated with the second RAT, where the collision is based on the data message and the one or more resources at least partially overlapping. The operations of 1515 may be performed in accordance with examples as disclosed herein. In some examples, aspects of the operations of 1515 may be performed by an IUC message transmitter 930 as described with reference to FIG. 9.

Figure 16:
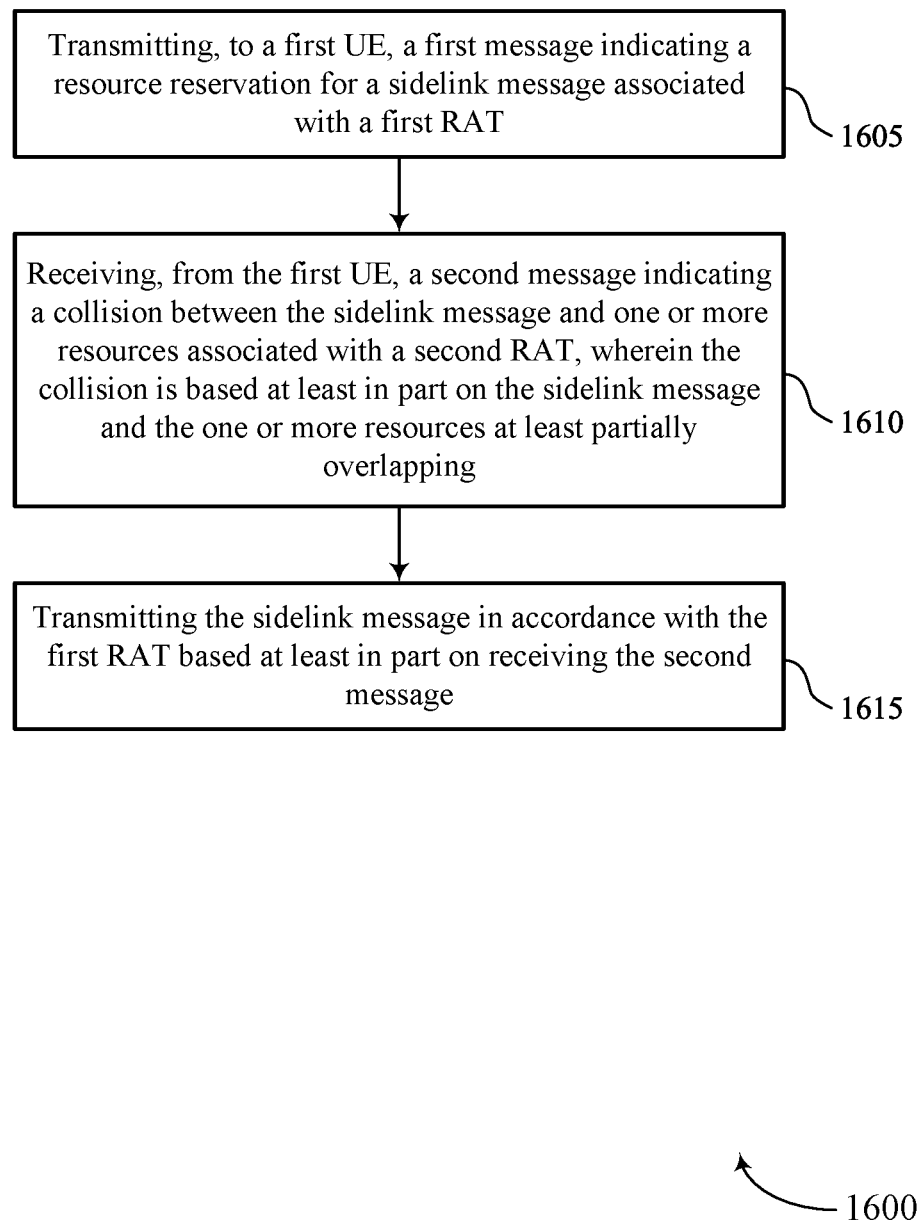

FIG. 16 shows a flowchart illustrating a method 1600 that supports techniques for inter-UE coordination-based sidelink communications in accordance with various aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the functions described herein. Additionally, or alternatively, the UE may perform aspects of the functions described herein using special-purpose hardware.

At 1605, the method may include transmitting, to a first UE, a first message indicating a resource reservation for a sidelink message associated with a first RAT. The operations of 1605 may be performed in accordance with examples as disclosed herein. In some examples, aspects of the operations of 1605 may be performed by a resource selection component 940 as described with reference to FIG. 9.

At 1610, the method may include receiving, from the first UE, a second message indicating a collision between the sidelink message and one or more resources associated with a second RAT, where the collision is based on the sidelink message and the one or more resources at least partially overlapping. The operations of 1610 may be performed in accordance with examples as disclosed herein. In some examples, aspects of the operations of 1610 may be performed by an IUC message receiver 935 as described with reference to FIG. 9.

At 1615, the method may include transmitting the sidelink message in accordance with the first RAT based on receiving the second message. The operations of 1615 may be performed in accordance with examples as disclosed herein. In some examples, aspects of the operations of 1615 may be performed by a sidelink message transmitter 945 as described with reference to FIG. 9.

The following provides an overview of aspects of the present disclosure:

Aspect 1: A method for wireless communications at a first UE, comprising: performing sensing of one or more sidelink messages that indicate a set of resources of a resource pool that are reserved by one or more other UEs for sidelink communications, respective resources of the set of resources being associated with a first RAT or a second RAT different from the first RAT; and transmitting, to a second UE, a message indicating resource information for transmissions by the second UE, wherein the resource information indicates that a first subset of resources of the set of resources is associated with the first RAT and a second subset of resources of the set of resources is associated with the second RAT.

Aspect 2: The method of aspect 1, wherein transmitting the message indicating the resource information comprises: transmitting the resource information indicating that the second subset of resources is to be excluded from available resources for the transmissions by the second UE based at least in part on the second subset of resources being associated with the second RAT.

Aspect 3: The method of any of aspects 1 through 2, wherein transmitting the message indicating the resource information comprises: transmitting the resource information indicating that the first subset of resources is to be included in available resources for the transmissions by the second UE based at least in part on the first subset of resources being associated with the first RAT.

Aspect 4: The method of any of aspects 1 through 3, wherein transmitting the message indicating the resource information comprises: transmitting an indication of a resource partition for the resource pool, the resource partition separating the resource pool into the first subset of resources and the second subset of resources.

Aspect 5: The method of aspect 4, wherein the indication of the resource partition includes an index corresponding to a percentage of resources of the resource pool that are allocated for transmissions associated with the first RAT, an index corresponding to a percentage of resources of the resource pool that are allocated for transmissions associated with the second RAT, or both.

Aspect 6: The method of any of aspects 4 through 5, wherein the indication of the resource partition includes a bitmap indicating resources of the resource pool that are available for the transmissions by the second UE, resources of the resource pool that are unavailable for the transmissions by the second UE, or both.

Aspect 7: The method of any of aspects 1 through 6, wherein transmitting the message indicating the resource information comprises: transmitting, as part of the message, an indication of a periodicity for applying the resource information, a periodicity with which the set of resources are reserved by the other UEs, a zone ID associated with the first UE, a group ID associated with the first UE, a priority associated with the second subset of resources, or a combination thereof.

Aspect 8: The method of any of aspects 1 through 7, further comprising: receiving, from the second UE, a request for the resource information, wherein transmitting the message is based at least in part on the request.

Aspect 9: The method of any of aspects 1 through 8, wherein transmitting the message indicating the resource information comprises: transmitting SCI, a MAC-CE, or a signal multiplexed with data associated with the first RAT.

Aspect 10: A method for wireless communications at a second UE, comprising: receiving, from a first UE, a message indicating resource information for transmissions by the second UE that are to use a resource pool, wherein the resource information indicates that a first subset of resources of a set of resources is associated with a first RAT and a second subset of resources of the set of resources is associated with a second RAT different from the first RAT, the set of resources being reserved by one or more other UEs for sidelink communications; selecting one or more resources from the resource pool for a data message based at least in part on the resource information; and transmitting the data message in accordance with the first RAT using the selected one or more resources.

Aspect 11: The method of aspect 10, wherein selecting the one or more resources comprises: excluding at least one resource from the resource pool based at least in part on the resource information indicating that the second subset of resources is to be excluded, wherein the second subset of resources is to be excluded based at least in part on the second subset of resources being associated with the second RAT, and wherein the second subset of resources includes the at least one resource.

Aspect 12: The method of any of aspects 10 through 11, wherein selecting the one or more resources comprises: including at least one resource in the resource pool based at least in part on the resource information indicating that the first subset of resources is to be included, wherein the first subset of resources is to be included based at least in part on the first subset of resources being associated with the first RAT, and wherein the first subset of resources includes the at least one resource.

Aspect 13: The method of any of aspects 10 through 12, wherein receiving the message indicating the resource information comprises: receiving an indication of a resource partition for the resource pool, the resource partition separating the resource pool into the first subset of resources and the second subset of resources.

Aspect 14: The method of aspect 13, wherein the indication of the resource partition includes an index, the method further comprising: mapping the index to a percentage of resources of the resource pool that are allocated for transmissions associated with the first RAT, a percentage of resources of the resource pool that are allocated for transmissions associated with the second RAT, or both.

Aspect 15: The method of any of aspects 13 through 14, wherein the indication of the resource partition includes a bitmap indicating resources of the resource pool that are available for the transmissions by the second UE, resources of the resource pool that are unavailable for the transmissions by the second UE, or both, and wherein selecting the one or more resources comprises: excluding at least one resource from the resource pool based at least in part on the bitmap.

Aspect 16: The method of any of aspects 10 through 15, wherein selecting the one or more resources comprises: excluding at least one resource of the second subset of resources from the resource pool based at least in part on a priority associated with the second subset of resources, a priority associated with the message, a reference signal received power associated with the message, or a combination thereof.

Aspect 17: The method of any of aspects 10 through 16, wherein selecting the one or more resources comprises: selecting the one or more resources based at least in part on the message further indicating a periodicity for applying the resource information, a periodicity with which the set of resources are reserved by the other UEs, a zone ID associated with the first UE, a group ID associated with the first UE, a priority associated with the second subset of resources, or a combination thereof.

Aspect 18: The method of any of aspects 10 through 17, wherein receiving the message indicating the resource information comprises: receiving SCI, a MAC-CE, or a signal multiplexed with data associated with the first RAT.

Aspect 19: The method of any of aspects 10 through 18, further comprising: transmitting, to the first UE, a request for the resource information, wherein receiving the message is based at least in part on the request.

Aspect 20: The method of any of aspects 10 through 19, wherein the message is received within a first time interval, and wherein selecting the one or more resources comprises: applying the resource information for the first message based at least in part on receiving the message within the first time interval.

Aspect 21: The method of aspect 20, further comprising: receiving a second message indicating second resource information for the transmissions by the second UE, wherein the second message is received during a second time interval that is subsequent to the first time interval; and discarding the second message based at least in part on receiving the second message during the second time interval.

Aspect 22: A method for wireless communications at a first UE, comprising: performing sensing of one or more sidelink messages that indicate a set of resources of a resource pool that are reserved by one or more other UEs, respective resources of the set of resources being associated with a first RAT or a second RAT different from the first RAT; receiving, from a second UE, a first message indicating a resource reservation for a data message to be transmitted by the second UE, the data message associated with the first RAT; and transmitting, to the second UE, a second message indicating a collision between the data message and one or more resources of the set of resources associated with the second RAT, wherein the collision is based at least in part on the data message and the one or more resources at least partially overlapping.

Aspect 23: The method of aspect 22, further comprising: transmitting, to the second UE, a third message indicating resource information for transmissions by the second UE based at least in part on transmitting the second message, wherein the resource information indicates that a first subset of resources of the set of resources is associated with the first RAT and a second subset of resources of the set of resources is associated with the second RAT.

Aspect 24: The method of any of aspects 22 through 23, wherein transmitting the second message comprises: transmitting the second message over a time domain resource, a frequency domain resource, or a code domain resource that is associated with collision indications for the first RAT and the second RAT.

Aspect 25: The method of any of aspects 22 through 24, further comprising: receiving, from the second UE, a third message indicating a request for resource information, wherein the second message is transmitted based at least in part on the request.

Aspect 26: The method of any of aspects 22 through 25, wherein transmitting the second message is based at least in part on a priority associated with the data message, a priority associated with the set of resources, a reference signal received power associated with the first message, or a combination thereof.

Aspect 27: A method for wireless communications at a second UE, comprising: transmitting, to a first UE, a first message indicating a resource reservation for a sidelink message associated with a first RAT; receiving, from the first UE, a second message indicating a collision between the sidelink message and one or more resources associated with a second RAT, wherein the collision is based at least in part on the sidelink message and the one or more resources at least partially overlapping; and transmitting the sidelink message in accordance with the first RAT based at least in part on receiving the second message.

Aspect 28: The method of aspect 27, further comprising: excluding the one or more resources from a set of available resources for the sidelink message based at least in part on the second message, wherein transmitting the sidelink message is based at least in part on the excluded one or more resources.

Aspect 29: The method of any of aspects 27 through 28, further comprising: receiving, from the first UE, a third message indicating resource information for transmissions by the second UE based at least in part on the received second message, wherein the resource information indicates that a first subset of resources of a set of resources of a resource pool is associated with the first RAT and a second subset of resources of the set of resources is associated with the second RAT.

Aspect 30: The method of any of aspects 27 through 29, wherein receiving the second message comprises: receiving the second message over a time domain resource, a frequency domain resource, or a code domain resource that is associated with collision indications for the first RAT and the second RAT.

Aspect 31: The method of any of aspects 27 through 30, further comprising: transmitting, to the first UE, a third message indicating a request for resource information, wherein the second message is received based at least in part on the request.

Aspect 32: An apparatus for wireless communications at a first UE, comprising a processor; memory coupled with the processor; and instructions stored in the memory and executable by the processor to cause the apparatus to perform a method of any of aspects 1 through 9.

Aspect 33: An apparatus for wireless communications at a first UE, comprising at least one means for performing a method of any of aspects 1 through 9.

Aspect 34: A non-transitory computer-readable medium storing code for wireless communications at a first UE, the code comprising instructions executable by a processor to perform a method of any of aspects 1 through 9.

Aspect 35: An apparatus for wireless communications at a second UE, comprising a processor; memory coupled with the processor; and instructions stored in the memory and executable by the processor to cause the apparatus to perform a method of any of aspects 10 through 21.

Aspect 36: An apparatus for wireless communications at a second UE, comprising at least one means for performing a method of any of aspects 10 through 21.

Aspect 37: A non-transitory computer-readable medium storing code for wireless communications at a second UE, the code comprising instructions executable by a processor to perform a method of any of aspects 10 through 21.

Aspect 38: An apparatus for wireless communications at a first UE, comprising a processor; memory coupled with the processor; and instructions stored in the memory and executable by the processor to cause the apparatus to perform a method of any of aspects 22 through 26.

Aspect 39: An apparatus for wireless communications at a first UE, comprising at least one means for performing a method of any of aspects 22 through 26.

Aspect 40: A non-transitory computer-readable medium storing code for wireless communications at a first UE, the code comprising instructions executable by a processor to perform a method of any of aspects 22 through 26.

Aspect 41: An apparatus for wireless communications at a second UE, comprising a processor; memory coupled with the processor; and instructions stored in the memory and executable by the processor to cause the apparatus to perform a method of any of aspects 27 through 31.

Aspect 42: An apparatus for wireless communications at a second UE, comprising at least one means for performing a method of any of aspects 27 through 31.

Aspect 43: A non-transitory computer-readable medium storing code for wireless communications at a second UE, the code comprising instructions executable by a processor to perform a method of any of aspects 27 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the techniques described herein may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the techniques described herein. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    sensing one or more sidelink messages that indicate a set of resources of a resource pool that are reserved by one or more other UEs for sidelink communications, respective resources of the set of resources being associated with a first radio access technology (RAT) or a second RAT different from the first RAT; and
    transmitting, to a second UE, a message indicating resource information for transmissions by the second UE, wherein the resource information indicates that a first subset of resources of the set of resources is associated with the first RAT and a second subset of resources of the set of resources is associated with the second RAT.

2. The method of claim 1, wherein transmitting the message indicating the resource information comprises:
    transmitting the resource information indicating that the second subset of resources is to be excluded from available resources for the transmissions by the second UE based at least in part on the second subset of resources being associated with the second RAT.

3. The method of claim 1, wherein transmitting the message indicating the resource information comprises:
    transmitting the resource information indicating that the first subset of resources is to be included in available resources for the transmissions by the second UE based at least in part on the first subset of resources being associated with the first RAT.

4. The method of claim 1, wherein transmitting the message indicating the resource information comprises:
    transmitting an indication of a resource partition for the resource pool, the resource partition separating the resource pool into the first subset of resources and the second subset of resources.

5. The method of claim 4, wherein the indication of the resource partition includes an index corresponding to a percentage of resources of the resource pool that are allocated for transmissions associated with the first RAT, an index corresponding to a percentage of resources of the resource pool that are allocated for transmissions associated with the second RAT, or both.

6. The method of claim 4, wherein the indication of the resource partition includes a bitmap indicating resources of the resource pool that are available for the transmissions by the second UE, resources of the resource pool that are unavailable for the transmissions by the second UE, or both.

7. The method of claim 1, wherein transmitting the message indicating the resource information comprises:
    transmitting, as part of the message, an indication of a periodicity for applying the resource information, a periodicity with which the set of resources are reserved by the other UEs, a zone identifier associated with the first UE, a group identifier associated with the first UE, a priority associated with the second subset of resources, or a combination thereof.

8. The method of claim 1, further comprising:
    receiving, from the second UE, a request for the resource information, wherein transmitting the message is based at least in part on the request.

9. The method of claim 1, wherein transmitting the message indicating the resource information comprises:
    transmitting sidelink control information, a medium access control (MAC) control element (MAC-CE), or a signal multiplexed with data associated with the first RAT.

10. A method for wireless communications at a second user equipment (UE), comprising:
    receiving, from a first UE, a message indicating resource information for transmissions by the second UE that are to use a resource pool, wherein the resource information indicates that a first subset of resources of a set of resources is associated with a first radio access technology (RAT) and a second subset of resources of the set of resources is associated with a second RAT different from the first RAT, the set of resources being reserved by one or more other UEs for sidelink communications;
    selecting one or more resources from the resource pool for a data message based at least in part on the resource information; and
    transmitting the data message in accordance with the first RAT using the selected one or more resources.

11. The method of claim 10, wherein selecting the one or more resources comprises:
    excluding at least one resource from the resource pool based at least in part on the resource information indicating that the second subset of resources is to be excluded, wherein the second subset of resources is to be excluded based at least in part on the second subset of resources being associated with the second RAT, and wherein the second subset of resources includes the at least one resource.

12. The method of claim 10, wherein selecting the one or more resources comprises:
    including at least one resource in the resource pool based at least in part on the resource information indicating that the first subset of resources is to be included, wherein the first subset of resources is to be included based at least in part on the first subset of resources being associated with the first RAT, and wherein the first subset of resources includes the at least one resource.

13. The method of claim 10, wherein receiving the message indicating the resource information comprises:
    receiving an indication of a resource partition for the resource pool, the resource partition separating the resource pool into the first subset of resources and the second subset of resources.

14. The method of claim 13, wherein the indication of the resource partition includes an index, the method further comprising:
    mapping the index to a percentage of resources of the resource pool that are allocated for transmissions associated with the first RAT, a percentage of resources of the resource pool that are allocated for transmissions associated with the second RAT, or both.

15. The method of claim 13, wherein the indication of the resource partition includes a bitmap indicating resources of the resource pool that are available for the transmissions by the second UE, resources of the resource pool that are unavailable for the transmissions by the second UE, or both, and wherein selecting the one or more resources comprises:
excluding at least one resource from the resource pool based at least in part on the bitmap.

16. The method of claim 10, wherein selecting the one or more resources comprises:
excluding at least one resource of the second subset of resources from the resource pool based at least in part on a priority associated with the second subset of resources, a priority associated with the message, a reference signal received power associated with the message, or a combination thereof.

17. The method of claim 10, wherein selecting the one or more resources comprises:
selecting the one or more resources based at least in part on the message further indicating a periodicity for applying the resource information, a periodicity with which the set of resources are reserved by the other UEs, a zone identifier associated with the first UE, a group identifier associated with the first UE, a priority associated with the second subset of resources, or a combination thereof.

18. The method of claim 10, wherein receiving the message indicating the resource information comprises:
receiving sidelink control information, a medium access control (MAC) control element (MAC-CE), or a signal multiplexed with data associated with the first RAT.

19. The method of claim 10, further comprising:
transmitting, to the first UE, a request for the resource information, wherein receiving the message is based at least in part on the request.

20. The method of claim 10, wherein the message is received within a first time interval, and wherein selecting the one or more resources comprises:
applying the resource information for the data message based at least in part on receiving the message within the first time interval.

21. The method of claim 20, further comprising:
receiving a second message indicating second resource information for the transmissions by the second UE, wherein the second message is received during a second time interval that is subsequent to the first time interval; and
discarding the second message based at least in part on receiving the second message during the second time interval.

22. A first user equipment (UE), comprising:
one or more memories storing processor-executable code; and
one or more processors coupled with the one or more memories and individually or collectively operable to execute the code to cause the first UE to:
perform sensing of one or more sidelink messages that indicate a set of resources of a resource pool that are reserved by one or more other UEs for sidelink communications, respective resources of the set of resources being associated with a first radio access technology (RAT) or a second RAT different from the first RAT; and
transmit, to a second UE, a message indicating resource information for transmissions by the second UE, wherein the resource information indicates that a first subset of resources of the set of resources is associated with the first RAT and a second subset of resources of the set of resources is associated with the second RAT.

23. The first UE of claim 22, wherein, to transmit the message indicating the resource information, the one or more processors are individually or collectively operable to execute the code to cause the first UE to:
transmit the resource information indicating that the second subset of resources is to be excluded from available resources for the transmissions by the second UE based at least in part on the second subset of resources being associated with the second RAT.

24. The first UE of claim 22, wherein, to transmit the message indicating the resource information, the one or more processors are individually or collectively operable to execute the code to cause the first UE to:
transmit the resource information indicating that the first subset of resources is to be included in available resources for the transmissions by the second UE based at least in part on the first subset of resources being associated with the first RAT.

25. The first UE of claim 22, wherein, to transmit the message indicating the resource information, the one or more processors are individually or collectively operable to execute the code to cause the first UE to:
transmit an indication of a resource partition for the resource pool, the resource partition separating the resource pool into the first subset of resources and the second subset of resources.

26. The first UE of claim 25, wherein the indication of the resource partition includes an index corresponding to a percentage of resources of the resource pool that are allocated for transmissions associated with the first RAT, an index corresponding to a percentage of resources of the resource pool that are allocated for transmissions associated with the second RAT, or both.

27. A second user equipment (UE), comprising:
one or more memories storing processor-executable code; and
one or more processors coupled with the one or more memories and individually or collectively operable to execute the code to cause the second UE to:
receive, from a first UE, a message indicating resource information for transmissions by the second UE that are to use a resource pool, wherein the resource information indicates that a first subset of resources of a set of resources is associated with a first radio access technology (RAT) and a second subset of resources of the set of resources is associated with a second RAT different from the first RAT, the set of resources being reserved by one or more other UEs for sidelink communications;
select one or more resources from the resource pool for a data message based at least in part on the resource information; and
transmit the data message in accordance with the first RAT using the selected one or more resources.

28. The second UE of claim 27, wherein, to select the one or more resources, the one or more processors are individually or collectively operable to execute the code to cause the second UE to:
exclude at least one resource from the resource pool based at least in part on the resource information indicating that the second subset of resources is to be excluded, wherein the second subset of resources is to be excluded based at least in part on the second subset of resources being associated with the second RAT, and wherein the second subset of resources includes the at least one resource.

29. The second UE of claim 27, wherein, to select the one or more resources, the one or more processors are individually or collectively operable to execute the code to cause the second UE to:
include at least one resource in the resource pool based at least in part on the resource information indicating that the first subset of resources is to be included, wherein the first subset of resources is to be included based at least in part on the first subset of resources being associated with the first RAT, and wherein the first subset of resources includes the at least one resource.

30. The second UE of claim 27, wherein, to receive the message indicating the resource information, the one or more processors are individually or collectively operable to execute the code to cause the second UE to:
receive an indication of a resource partition for the resource pool, the resource partition separating the resource pool into the first subset of resources and the second subset of resources.

* * * * *